United States Patent
Sugita et al.

(10) Patent No.: US 8,049,841 B2
(45) Date of Patent: Nov. 1, 2011

(54) WIRE GRID POLARIZED AND LIQUID CRYSTAL DISPLAY DEVICE USING THE SAME

(75) Inventors: Tatsuya Sugita, Takahagi (JP); Shoichi Hirota, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 454 days.

(21) Appl. No.: 11/874,949

(22) Filed: Oct. 19, 2007

(65) Prior Publication Data

US 2008/0094547 A1  Apr. 24, 2008

(30) Foreign Application Priority Data

Oct. 20, 2006  (JP) .................................. 2006-286364

(51) Int. Cl.
*G02F 1/1335* (2006.01)

(52) U.S. Cl. .............. 349/96; 349/141; 349/9; 349/113; 349/114

(58) Field of Classification Search ................... 349/114, 349/141, 96, 9, 113, 139, 65, 138, 67; 359/486; 362/617, 609, 97.2
See application file for complete search history.

(56) References Cited

U.S. PATENT DOCUMENTS

| | | | | |
|---|---|---|---|---|
| 5,986,730 A | * | 11/1999 | Hansen et al. | 349/96 |
| 6,348,995 B1 | | 2/2002 | Hansen et al. | |
| 6,532,111 B2 | * | 3/2003 | Kurtz et al. | 359/485.05 |
| 6,798,464 B2 | * | 9/2004 | Bietsch et al. | 349/12 |
| 6,981,792 B2 | * | 1/2006 | Nagakubo et al. | 362/600 |
| 7,106,395 B2 | * | 9/2006 | Maeda | 349/65 |
| 7,480,017 B2 | * | 1/2009 | Fisher et al. | 349/96 |
| 7,605,883 B2 | * | 10/2009 | Yamaki et al. | 349/96 |
| 2004/0135942 A1 | | 7/2004 | Lee et al. | |
| 2004/0264350 A1 | | 12/2004 | Ueki et al. | |

FOREIGN PATENT DOCUMENTS

| | | |
|---|---|---|
| JP | 2003-75851 | 3/2003 |
| JP | 2004-220031 | 8/2004 |
| JP | 2005-37900 | 2/2005 |
| JP | 2005-189392 | 7/2005 |
| JP | 2005-250430 | 9/2005 |
| JP | 2005-353431 | 12/2005 |

OTHER PUBLICATIONS 8.4: A Wire Grid Stereoscopic Display, Lee et al, SID 06 Digest pp. 89-92.

* cited by examiner

*Primary Examiner* — Thoi V Duong
(74) *Attorney, Agent, or Firm* — Antonelli, Terry, Stout & Kraus, LLP.

(57) ABSTRACT

An image is displayed by modulating TM-polarized light between the polarizer 2 and the wire grid polarizer 18 through the variation of the optical characteristic of the liquid crystal layer 12 interposed between the transparent plate 4 and the transparent plate 26. Degradation of contrast in the bright ambience is avoided by providing an absorption layer for absorbing TE-polarized light on that surface of the wire grid polarizer 18 which faces the liquid crystal layer 12.

22 Claims, 17 Drawing Sheets

WIRE GRID POLARIZED AND LIQUID CRYSTAL DISPLAY DEVICE USING THE SAME

BACKGROUND OF THE INVENTION

This invention relates to a wire grid polarizer and also to a liquid crystal display device of transmission type which uses such a wire grid polarizer and a liquid crystal display device of transflective type which uses such a wire grid polarizer and enjoys both transmission and reflection types of display.

U.S. Pat. No. 6,348,995 discloses a reflection type image display device which provides image display by using polarized light reflected from the wire grid polarizer formed of thin closely spaced conductive elements disposed on the wavy surface of the substrate in the image display device, in order to reduce parallax and specular reflection and to improve contrast. The polarized light that passes through the wire grid polarizer is absorbed in the light absorbing layer dispose on the rear surface of the wire grid polarizer.

JP-A-2005-250430 discloses a liquid crystal display (hereafter referred to also as LCD) device, intended for improved image quality and reduction in size, comprising the first plate whose pixel portion is provided with light reflection and transmission sections, the second plate disposed at a distance opposite to the first plate, and the liquid crystal layer interposed between the first and the second plates, wherein the polarizing layer is formed at least on that part of the surface of the first plate which is adjacent to the liquid crystal layer and corresponds to the light reflecting section.

SID (Society of Information Display) 06 Digest, 2006, p. 89, discloses a 3-D display using a transmission type liquid crystal display incorporating therein a wire grid polarizer.

The wire grid polarizer used in the liquid crystal display device disclosed in U.S. Pat. No. 6,348,995 belongs to the reflective type light polarizer, and therefore is different from the polarizer of light absorption type. This reflective type polarizer is transparent to light of one polarization orientation while it reflects light of another polarization orientation perpendicular to the one polarization. Accordingly, the contrast of the reflection type LCD device can be improved by incorporating the wire grid polarizer in the LCD device itself. However, if the disclosed configuration is used in the LCD device having a light transmission section, a problem arises that contrast is lowered in a brightly illuminated ambience due to the polarized light reflected from the wire grid polarizer.

If a wire grid polarizer is used in a transmission type LCD device as proposed in the SID 06 Digest, an image of good quality can be observed as a result of the transmission of backlight in a dim ambience. However, there will arise a problem that in the brightly illuminated ambience the image quality is degraded due to the degradation of contrast caused by the reflection of ambience light.

Also, JP-A-2005-250430 discloses a coating type polarizing material to serve as a polarizing layer disposed on that surface of the first plate which faces the liquid crystal layer. However, such a coating type polarizer has a problem that it is inferior in performance to an ordinary polarizer which is attached externally to an LCD device. Accordingly, in order to improve contrast, the coating type polarizer should not be used singly, but must be accompanied by an external polarizer.

Further, U.S. Pat. No. 6,348,995 suggests that the polarization performance of such a coating type polarizing layer is insufficient and suggest that an additional polarizer should be provided on the surface of the first plate opposite to the liquid crystal layer to obtain high contrast and therefore improved image quality.

SUMMARY OF THE INVENTION

The object of this invention is to provide a thin LCD device of transmission type or transflective type displaying high contrast images.

According to one embodiment of this invention, there is provided an LCD device of transmission type or transflective type wherein a wire grid polarizer provided with a light absorbing layer for absorbing light of TE polarization is used as a polarizer. This wire grid polarizer can be used as the common electrode in the IPS mode and also as the pixel electrode in the TN mode.

According to another embodiment of this invention, there is provided an LCD device of transmission type or transflective type wherein one surface of the polarizer absorbs light of TE polarization and the other surface of the polarizer reflects light of TE polarization. A lens array provided between the transparent plate and the backlight source (planar light emitting element) of the LCD device increases the amount of transmitted light originating from the backlight source effectively. Further, the incorporation of the polarizer in the LCD device itself enables the transparent plate to be used as a light guiding plate for the backlight.

According to still another embodiment of this invention, there is provided a wire grid polarizer whose one surface absorbs light of TE polarization. A composite layer of dielectric material and metal or an coating type polarization layer can serve as such a light absorbing layer.

According to yet another embodiment of this invention, there is provided a thin, high-contrast LCD device of transmission type or transflective type wherein a wire grid polarizer with at least one side thereof provided with a means for absorbing light of TE polarization is employed.

This invention is intended to be applied to a LCD device having transmission display sections. According to this invention, the thickness and the cost of an LCD device of transmission type or transflective type can be reduced while its brightness in display can be increased. Accordingly, the LCD device embodying this invention will be best suited for use in such midi or mini information apparatus such as portable telephones, digital cameras and car navigation systems.

Other objects, features and advantages of the invention will become apparent from the following description of the embodiments of the invention taken in conjunction with the accompanying drawings.

DETAILED DESCRIPTION OF THE EMBODIMENT

This invention will now be described below by way of embodiments with reference to attached drawings.

Embodiment 1

A first embodiment of this invention will be described with reference to FIGS. 1 to 11.

Figure 1:
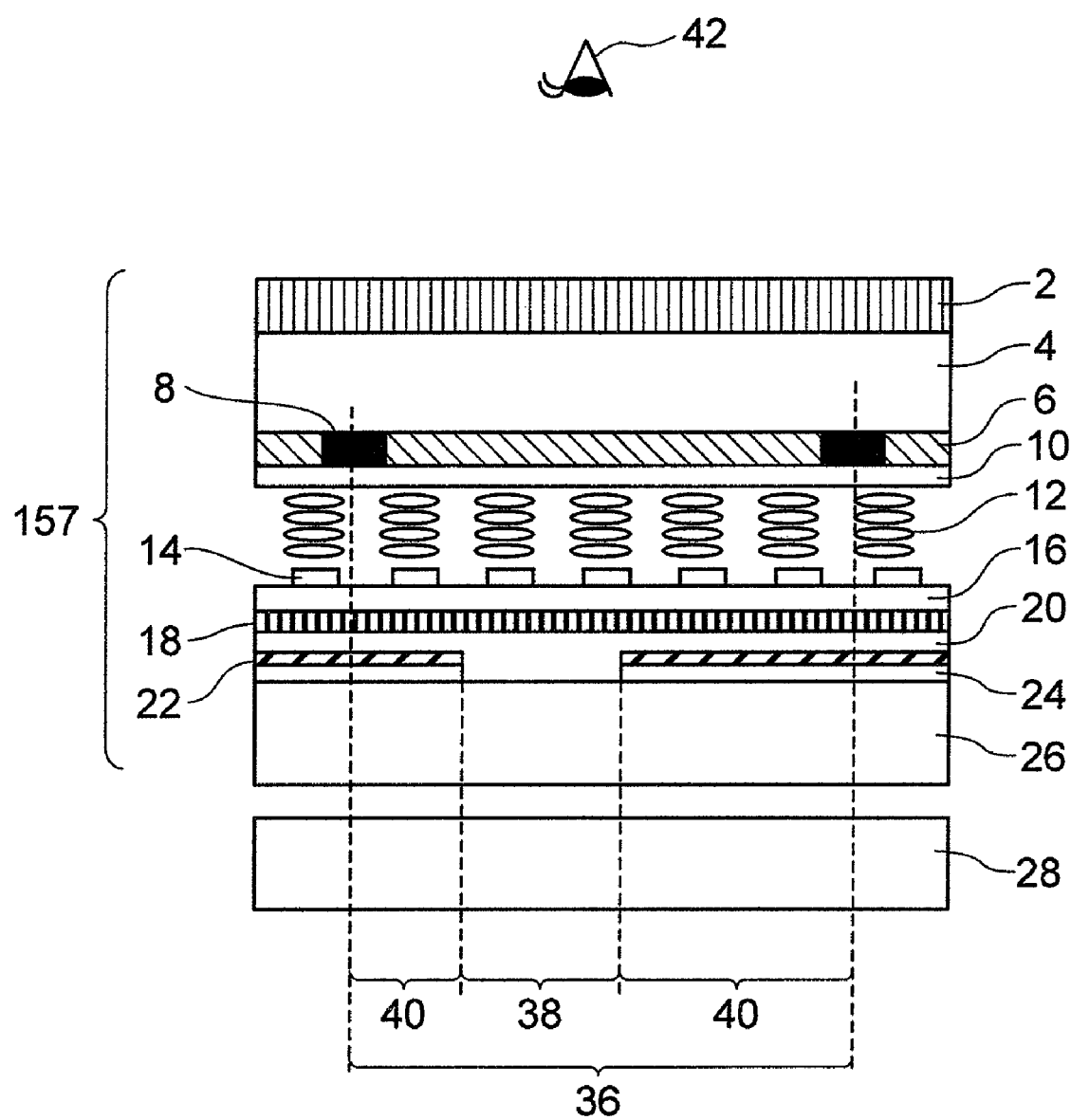
FIG. 1 shows a cross-section view of a liquid crystal display device as a first embodiment of this invention.

FIG. 1 shows a cross-section view of a liquid crystal display device as the first embodiment of this invention. The LCD device according to this embodiment uses a liquid crystal display element 157 of transflective type and a backlight source 28 in the form of a planar light emitting element. A liquid crystal layer 12 is disposed in the space between an upper plate 4 (second transparent plate) and a lower plate 26 (first transparent plate), both plates being disposed opposite to each other. The optical characteristic of the liquid crystal layer 12 is switched, and an upper polarizer 2 (second polarizer) and a wire grid polarizer 18 (first polarizer, hereafter referred to as WGP) disposed on that surface of the lower plate 26 which faces the liquid crystal layer 12 modulate the intensity of light so that images can be displayed.

This embodiment employs a transflective display structure wherein each sub-pixel 36 consists of a transmission aperture 38 and a reflection display section 40. As display mode is used a so-called IPS (In-Plane Switching) mode wherein switching is performed by using electric fields developed between the WGP 18 regarded as a common electrode (first electrode) and a comb-like pixel electrode 14 (second electrodes) disposed on a layer different from the common electrode (first electrode), an insulation layer 16 being interposed between the first and second electrodes.

The structure and the characteristics of the WGP 18 used in this embodiment will be described below with reference to FIGS. 2 to 6.

Figure 2:
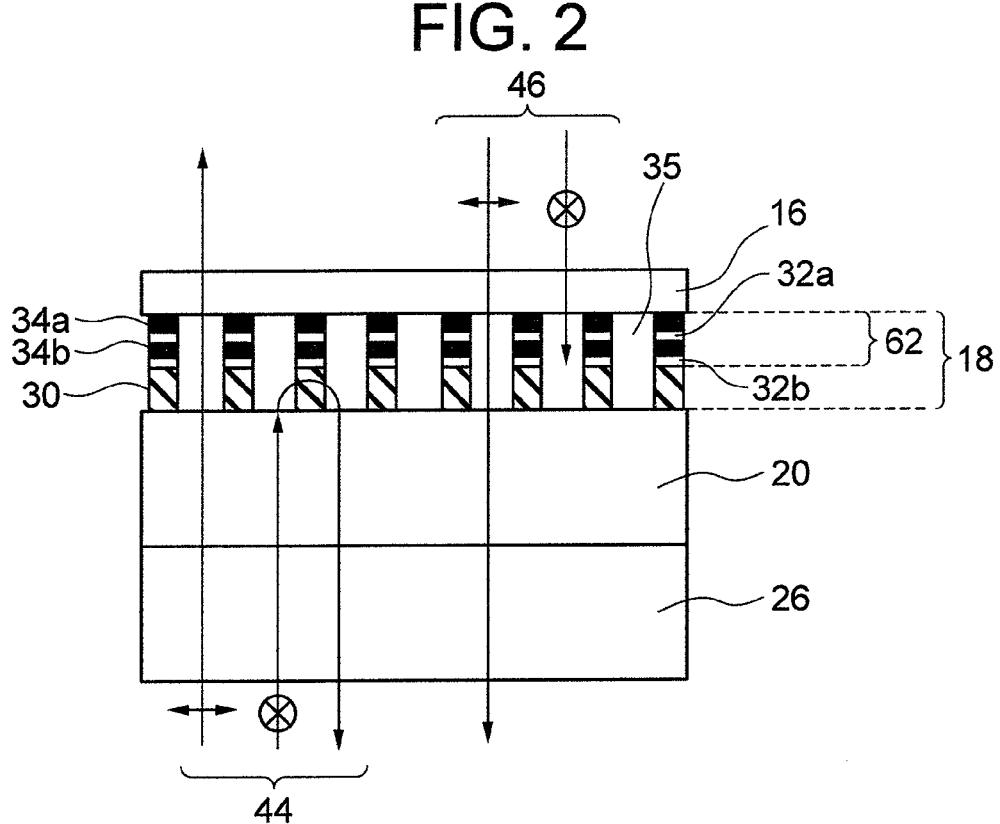
FIG. 2 shows a cross-section view of a part of the WGP (wire grid polarizer) in the transmission display section of the liquid crystal display device shown in FIG. 1.
Figure 3:
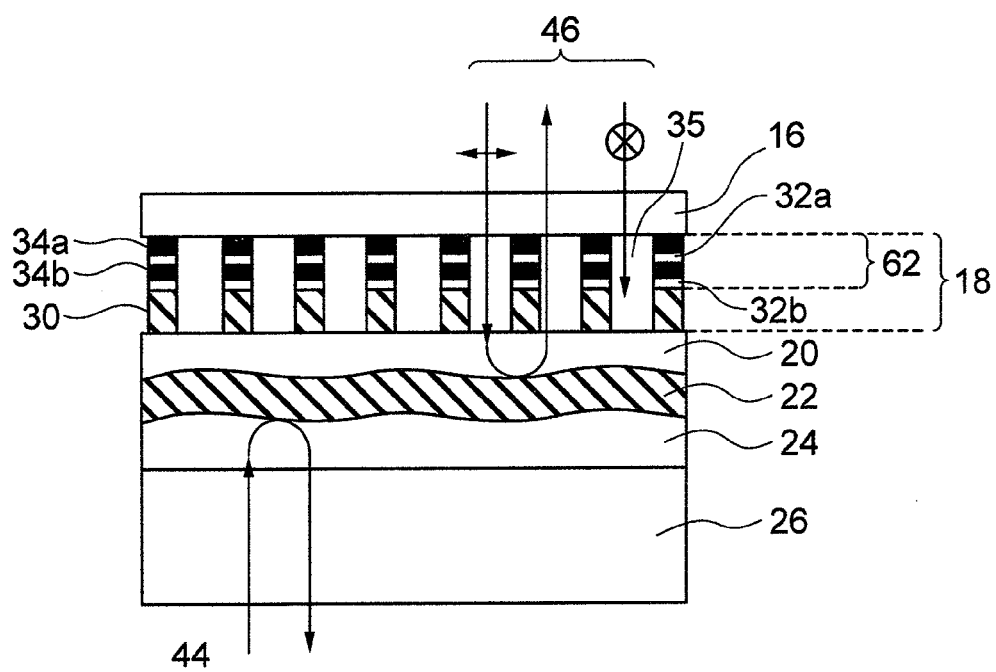
FIG. 3 shows a cross-section view of a part of the WGP (wire grid polarizer) in the reflection display section of the liquid crystal display device shown in FIG. 1.

FIG. 2 shows a cross-section view of a part of the WGP 18 in the vicinity of the transmission aperture 38 of the liquid crystal display device shown in FIG. 1. FIG. 3 shows a cross-section view of a part of the WGP 18 in the vicinity of the reflection display section 40 of the liquid crystal display device shown in FIG. 1. The WGP 18 is featured by a light absorbing multi-film layer 62 provided on the outer side of the WGP on which external light 46 impinges.

In general, a wire grid polarizer consists mainly of fine metal wires arranged parallel to one another at a repetition interval equal or less than half the wavelength of the light used for display. The material for the fine metal wires, the repetition interval of the fine metal wires and the width of each fine metal wire are selected such that the transmittivity of polarized light having polarization orientation perpendicular to the fine metal wire pieces (light of TM polarization) becomes as high as possible while the reflectivity of polarized light having polarization orientation parallel to the fine metal wire pieces (light of TE polarization) becomes as low as possible. Accordingly, the wire grid polarizer is said to have a polarization characteristic such that the light of TM polarization passes through it while it reflects the light of TE polarization. When such an ordinary wire grid polarizer is used for the light transmission display section of an LCD device, a problem arises that contrast lowers in the brightly illuminated ambience. The cause of the contrast degradation is due to the fact that in dark display part of the external light 46 having passed through the upper polarizer 2 is reflected by the wire grid polarizer and turned back again through the upper polarizer 2.

According to this embodiment, therefore, a light absorbing multi-film layer 62 is provided on that side of the WGP 18 on which the external light 46 impinges (i.e. adjacent to the liquid crystal layer 12), so that the TM-polarized component of the external light 46 impinging on the WGP 18 may be absorbed. The WGP 18 is built in such a manner that dielectric wire layers 32b and 32a for absorbing light and metal wire layers 34b and 34a for absorbing light are alternately stacked on a metal wire layer 30 consisting of fine aluminum wires. For this WGP 18, the repetition interval of the fine aluminum wires is chosen to be 120 nm, the width of each fine aluminum wire 36 nm, and the height of each fine aluminum wire 100 nm. The dielectric wire layers 32b and 32a for absorbing light and the metal wire layers 34b and 34a for absorbing light are alternately stacked on the metal wire layer 30.

The light absorbing dielectric layer 32 is made of zirconium oxide $ZrO_2$ and the light absorbing metal layer 34 of molybdenum Mo. The $ZrO_2$ layer 23.3 nm thick, the Mo layer 22.9 nm thick, the $ZrO_2$ layer 64.2 nm thick, and the Mo layer 4.2 nm thick are stacked in this order from bottom on the metal wire layer 30. The width of each component (i.e. wire-like fine piece) of the light absorbing dielectric layers 32b and 32a and the light absorbing metal layers 34b and 34a is made identical with the width of each piece of the fine wire of the metal wire layer 30.

Material for the metal layer 30 is preferably aluminum which has a small refractive index (i.e. real part of complex refractive index) and a large extinction coefficient (i.e. imaginary part of complex refractive index). However, it is noted that aluminum is not solely chosen for the material but any other substance may be used that has a high transmittivity with respect to TM-polarized light within the visible spectrum and that is suitable for the structure of the WGP 18.

In order for the TE-polarized components to be absorbed due to the optical interference in the metal wire layer 30 and the light absorbing multi-film layer 62, material for the fine wire components of the light absorbing metal layers 34 should preferably be such that it absorbs as much TE-polarized light and as little TM-polarized light, as possible. For this purpose, material having a refractive index (i.e. real part of complex refractive index) of not less than unity and an extinction coefficient of magnitude comparable to the refractive index should preferably be used for the light absorbing metal layers 34. Accordingly, both refractive index and extinction coefficient should preferably be not less than unity, especially not less than two. Metals that satisfy this condition include molybdenum, tungsten, nickel, niobium, iron, titanium and chromium.

Material for the light absorbing dielectric wire layers 32 should also have as high a refractive index as possible. It should preferably have a refractive index of not less than 1.8 and as small an absorbing coefficient as possible. Zirconium oxide $ZrO_2$, titanium oxide $TiO_2$, silicon nitride $Si_3N_4$, aluminum nitride AlN and tantalum pentoxide $Ta_2O_5$ are suitable for the material.

The light absorbing multi-film layer 62 may be constructed with a lamination of a plurality of composite layers, each composite layer consisting of a pair of a light absorbing dielectric wire layer 32 and a light absorbing metal wire layer 34. The number of laminated composite layers can be determined such that required characteristics are obtained. The constituent materials may be varied from one composite layer to another.

Photolithography technique is used to fabricate the WGP 18. Dielectric wire layers 32 for absorbing light and metal wire layers 34 for absorbing light are successively deposited on a metal wire layer 30 until each deposited layer reaches a desired thickness. A resist film is coated onto the exposed surface of the uppermost light absorbing metal wire layer 34*a*. A fine resist pattern is formed by pattern exposure technique using a hologram. By using the resist pattern as mask, the light absorbing metal wire layers 34, the light absorbing dielectric wire layers 32 and the metal wire layer 30 are etched and the WGP 18 is fabricated. The way for fabricating such a WGP 18 is not restricted to the method described above. A nano-imprint technique may be employed and a periodic structure formed through self assembly may also be employed.

In the fabrication of the light absorbing multi-film layer 62, it is possible to form the fine pattern of the metal wire layer 30 first and then to form the light absorbing dielectric wire layers 32 and the light absorbing metal wire layers 34 in alternate stack. Alternatively, a WGP 18 fabricated on a separate substrate may be transferred onto the flattening layer 20.

The medium in the space 35 between the component wires should have a smaller refractive index to obtain preferable characteristics for a polarizer such as TM-polarized light transmittivity and the ratio of light transmission to extinction. If the space 35 is filled with transparent material, the material should have a small refractive index, for example, of not more than 1.5 or not more than 1.4 ideally. If the WGP 18 is in direct contact with the liquid crystal layer 12, the space 25 may be filled with the same liquid crystal. The best performance of the WGP 18 can be obtained with the space filled with nothing. To keep this space vacant, it is preferable to seal the space with an insulation layer 16 to prevent the liquid crystal from flowing into the space. The insulation layer 16 should also have a small refractive index and silicon oxide $SiO_2$ is a suitable material for the insulation layer 16.

It would be easy to fabricate such a WGP 18 in a flat surface. Since the distribution of reflection angles of light in the reflection display is controlled by a wavy reflecting layer 22, the WGP 18 can be of planar structure. If the WGP 18 is of planar structure, the reflection of light from it is specular so that contrast in the bright ambience can be prevented from lowering. This is a notable merit. Accordingly, the wavy surface of the wavy reflecting layer 22 is smoothed by the use of a transparent flattening layer 20. A WGP 18 is formed on the flattened surface. It is, however, not always necessary to use such a flattening layer 20 if a WGP 18 formed on a wavy reflecting layer 22 has sufficient characteristics. The repetition interval of the wire components of the WGP 18 should be sufficiently small. In order for the completed WGP 18 to function effectively in the visible spectrum, the interval should preferably be not more than 150 nm. It is also preferable to make the width of each wire component small enough, that is, not more than 50% of the repetition interval.

Further, since brightness and contrast required in the transmission display section are different from those needed for the reflection display section, the structure of each wire component and the thickness of each layer in the WGP 18 may be varied according as they are for the transmission display section or for the reflection display section. In order to increase the reflectivity for the TM-polarized light so far as a desired contrast is obtained, each metal wire layer 30 and each light absorbing metal layer 34 can be thinner in the reflection display section than in the transmission display section.

Incidentally, the view angle in reflection display can be controlled by controlling the distribution of reflection angles by the wavy reflecting layer 22. Light 44 from the backlight source 28 first enters the reflection display section, then reflected from the wavy reflecting layer 22, and finally turned back toward the backlight source 28, whereby reuse of light is possible.

The wavy reflecting layer 22 is fabricated by covering the wavy surface of the wavy layer 24 with a film of metallic material such as aluminum or silver which has a high reflectivity. Any conventional fabricating process may be used to form the wavy layer 24. Possible processes include the hot melt method wherein base material of polymer is processed by photolithographic technique and then heated to melted state, the photolithographic method using a gray scale mask, and the transfer method wherein a wavy layer formed on a separate film is transferred onto a surface of interest. Since the actual shape of the wavy reflecting surface determines the distribution of reflecting angles of the external light 46, the surface shape of the wavy layer is controlled such that a desired distribution of reflecting angles can be obtained.

Figure 4:
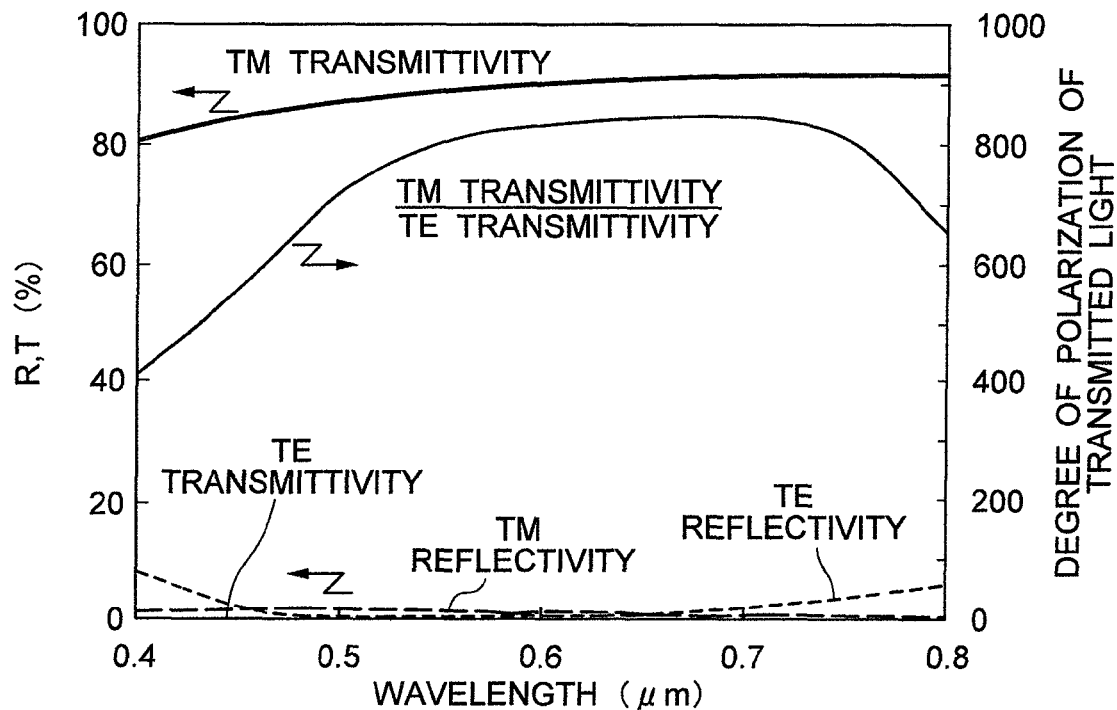
FIG. 4 shows a graph of the spectra of the lights impinging from the side of the light absorbing multi-film layer when they are transmitted through and reflected from the WGP, respectively.
Figure 5:
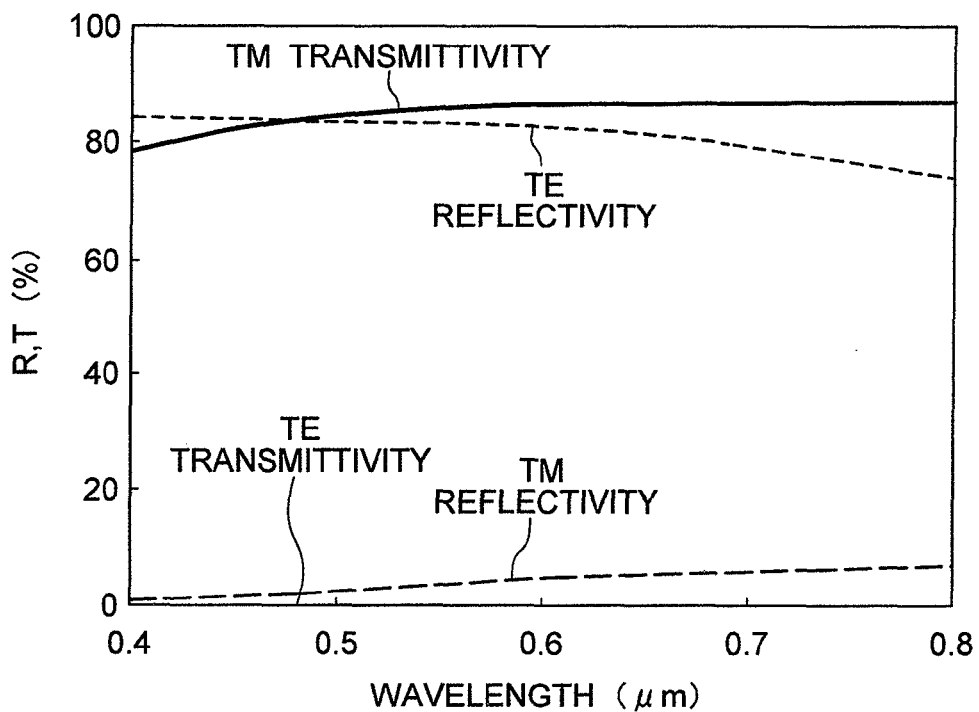
FIG. 5 shows a graph of the spectra of the lights impinging from the side of the metal wire layer when they are transmitted through and reflected from the WGP, respectively.

FIGS. 4 and 5 respectively show graphs of the spectra of the transmitted and reflected lights in the transmission display section of the WGP 18.

FIG. 4 shows a graph of the transmittivity (T) and reflectivity (R) of the WGP 18 for the external light 46 when light 46 enters the transmission aperture shown in FIG. 2 from the side of the light absorbing multi-film layer 62. The WGP 18 shows a high transmittivity and a low reflectivity for TM-polarized light as in the case of an ordinary wire grid polarizer. But it shows a low transmittivity and a low reflectivity for TE-polarized light. This means that the WGP of this embodiment is different from an ordinary wire grid polarizer and that the WGP absorbs the TM-polarized light. The polarization degree for the transmitted light is defined as the ratio of transmittivity for TM-polarized light to transmittivity for TE-polarized light, and since the ratio is large as shown in FIG. 4, it is apparent that the polarization degree for the transmitted light is high in the visible spectrum region.

FIG. 5 shows a graph of the transmittivity and reflectivity of the WGP 18 for the backlight 44 when light 44 enters the transmission aperture shown in FIG. 2 from the side of the metal wire layer 30. In this case, as with an ordinary wire grid polarizer, the WGP 18 shows a high transmittivity and a low reflectivity for the TM-polarized light while it shows a high reflectivity and a low transmittivity for the TE-polarized light. The absorption of both TM-polarized light and TE-polarized light by the WGP 18 is low so that light loss is small. The transmittivity is the same as in the case shown in FIG. 4 where the external light 46 enters the transmission aperture shown in FIG. 2 from the side of the light absorbing multi-film layer 62. Hence, the polarization degree for the transmitted light also takes the same value, producing transmitted light having a high degree of polarization. On the other hand, as is different from the case shown in FIG. 4, the reflectivity for the TE-polarized light is high. Accordingly, the TE component of the backlight 44 impinging on the WGP 18 is reflected and turned back toward the backlight source 28.

Figure 6:
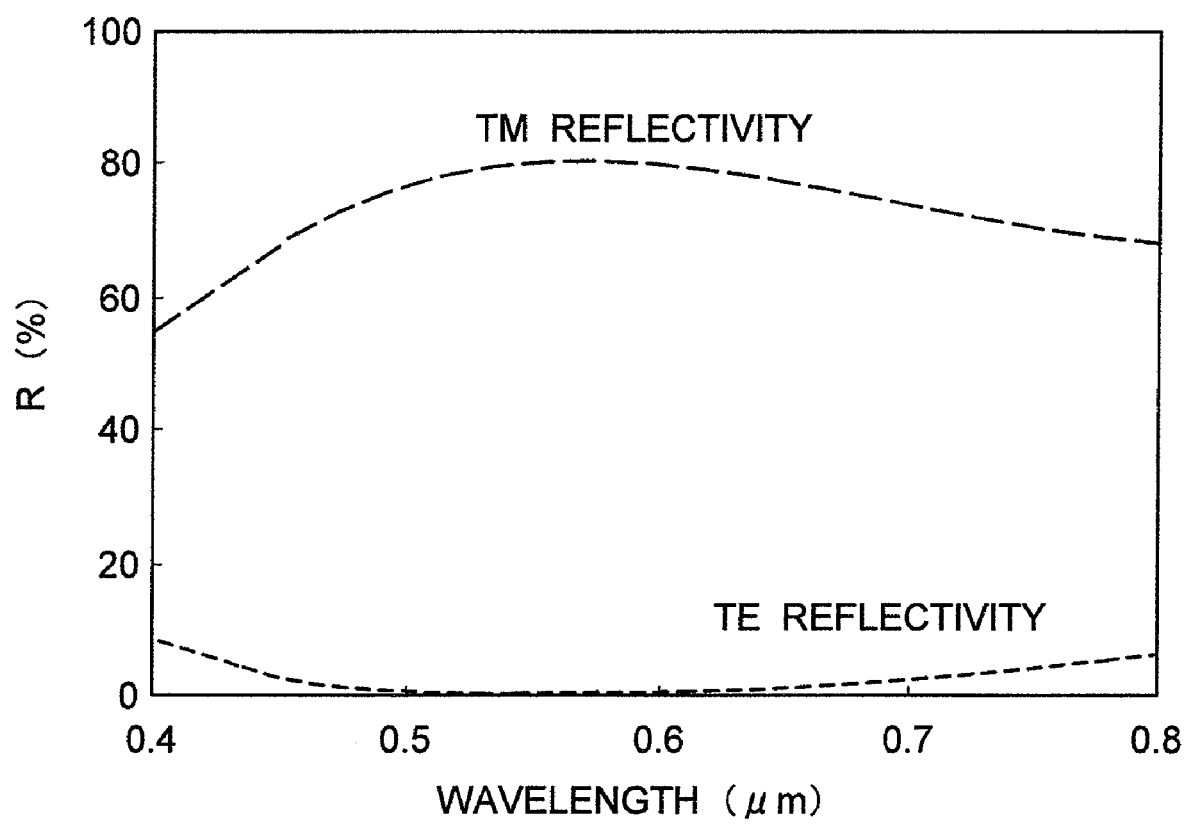
FIG. 6 shows in a graph of the spectra of lights reflected by the reflection display section.

FIG. 6 shows a graph of the spectra of lights reflected by the reflection display section shown in FIG. 3. In this reflection display section, the TM-polarized light having passed through the WGP 18 further pass through the flattening layer 20 and is then reflected from the wavy reflecting layer 22. The reflected TM-polarized light returns after passing again through the WGP 18. The TE-polarized light is finally absorbed by the light absorbing multi-film layer 62. Accordingly, as shown in FIG. 6, the TM-polarized light is reflected and the TE-polarized light is absorbed, so that the reflectivity becomes low.

Figure 7:
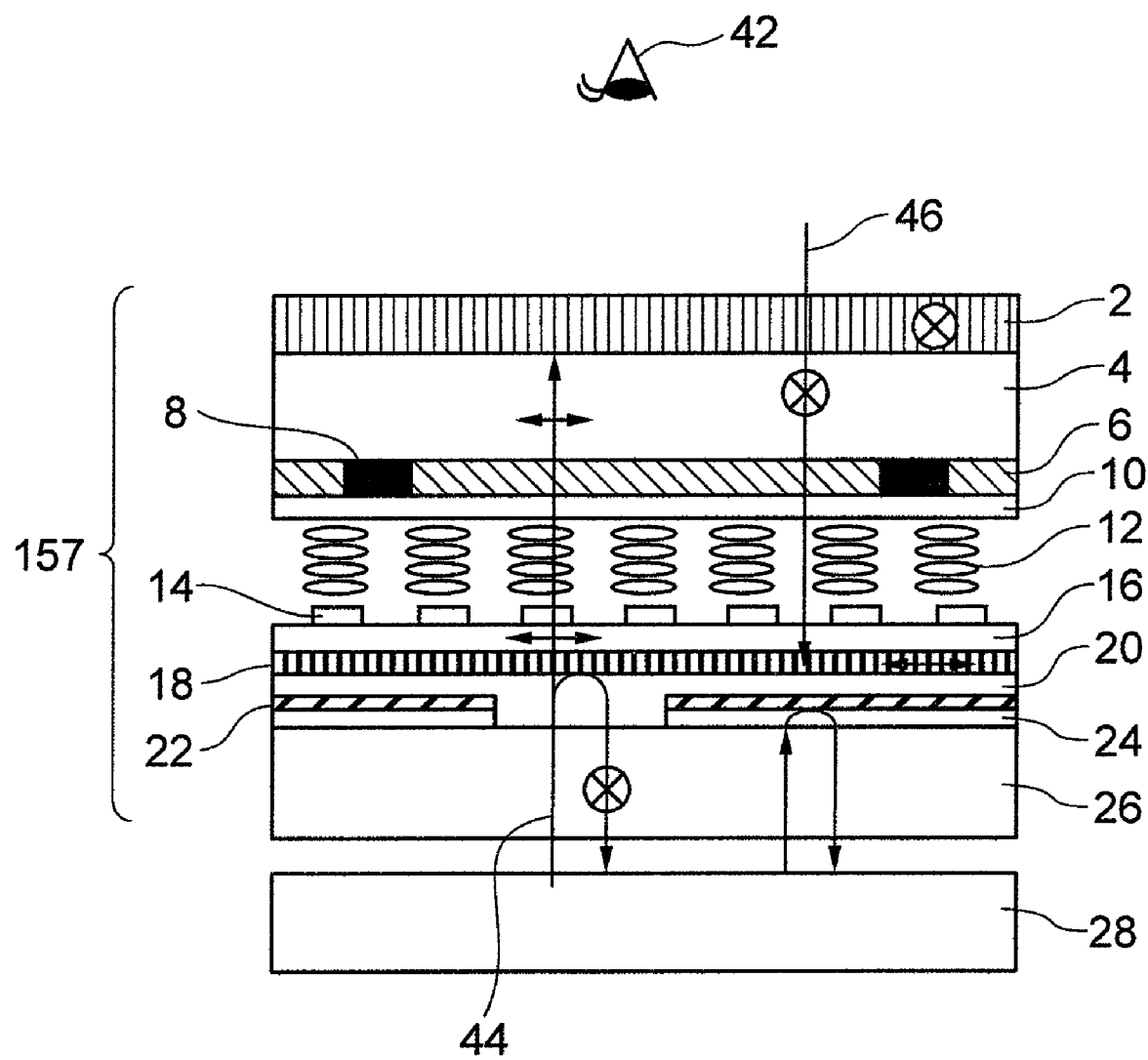
FIG. 7 shows the behavior of light rays impinging on the LCD element in relation to dark display.

FIG. 7 shows the behavior of light rays impinging on the LCD element 157 in the case of dark display. The LCD element 157 is designed to give normally black display where the backlight 44 having passed through the WGP 18 is absorbed in the upper polarizer 2 when no voltage is applied to the liquid crystal layer 12. The TM-component of the backlight 44 impinging on the WGP 18 passes through the WGP 18 and the TE component of the backlight 44 impinging on the WGP 18 is reflected and turned back toward the backlight source 28. The light having passed through the WGP 18, the liquid crystal layer 12 and the color filter 6 is absorbed in the upper polarizer 2 and therefore does not reach the viewer's eyes 42. As for the external light 46, it is polarized when passing through the upper polarizer 2, and the polarized component further passes through the color filter 6, the liquid crystal layer 12 and reaches the WGP 18. Since the polarized component of the external light 46 impinging on the WGP 18 is TE-polarized light, it is absorbed in the WGP 18 which incorporates the light absorbing multi-film layer 62 therein. Consequently, the external light 46 having reached the WGP 18 is absorbed therein so that both transmission and reflection display sections give dark display.

Figure 8:
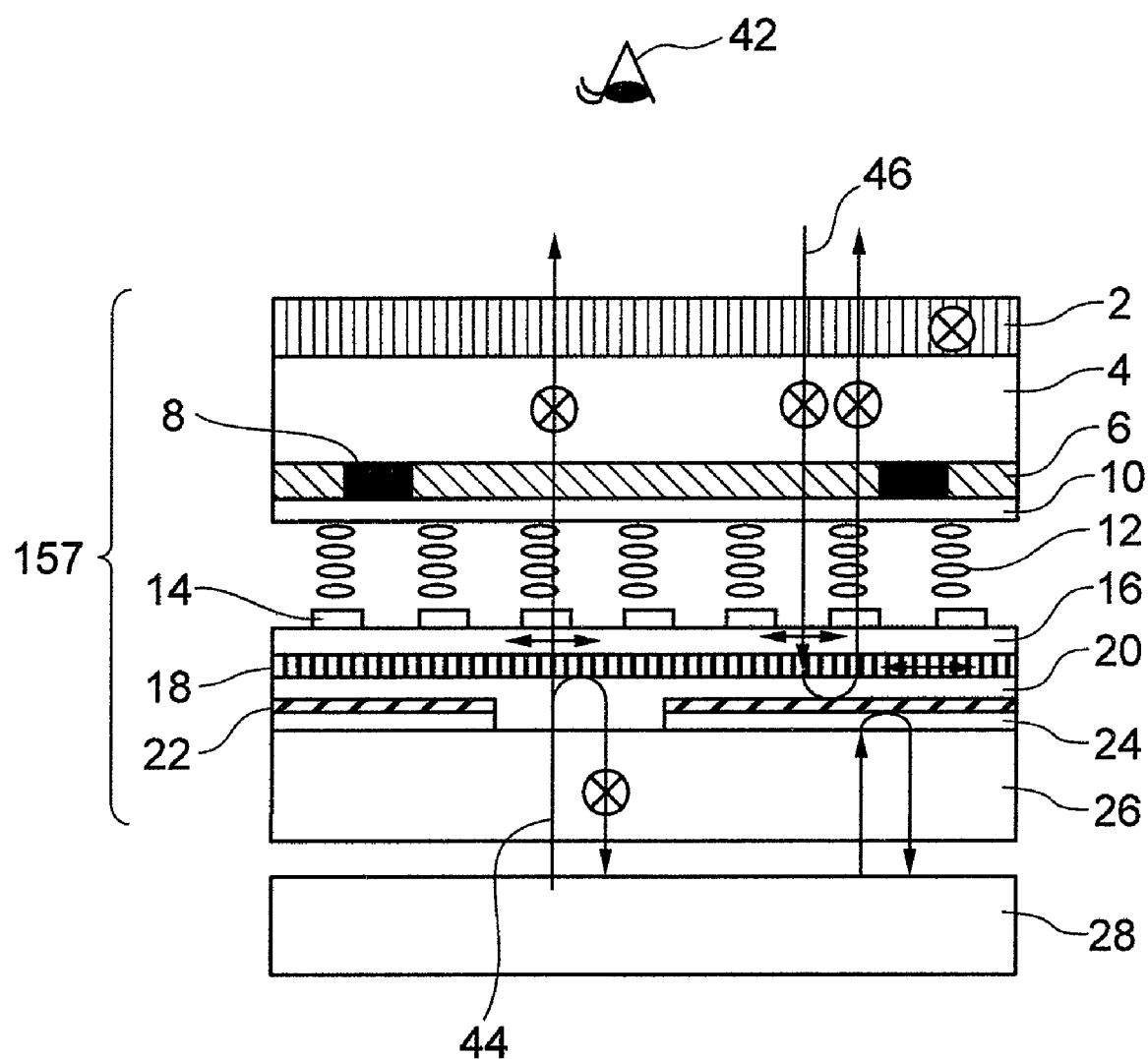
FIG. 8 shows the behavior of light rays impinging on the LCD element in relation to white display.

FIG. 8 shows the behavior of light rays impinging on the LCD element 157 in the case of white display. In this case of white display, a suitable voltage is applied to the liquid crystal layer 12. As a result, the molecules in the liquid crystal layer 12 are rotated so that the orientation of polarization of the polarized light entering the layer 12 is rotated by 90 degrees when it leaves the layer 12. The TM-polarized component of the backlight 44, which has passed through the WGP 18, has its polarization orientation rotated by 90 degrees, further passes through the color filter 6 and the upper polarizer 2, and is finally cast onto the viewer's eyes 42. The TE-polarized component of the backlight 44 reflected from the WGP 18 is turned back toward the backlight source 28 and reused. As for the external light 46, it passes through the upper polarizer 2 to produce linearly polarized component. The linearly polarized component of the external light 46 then passes through the color filter 6 and further has its polarization orientation rotated by 90 degrees while passing through the liquid crystal layer 12. Accordingly, the linearly polarized component, which has been turned into TM-polarized light, impinges on the WGP 18. The TM-polarized light passes through the WGP 18, is reflected from the wavy reflecting layer 22, and passes again through the WGP 18 as it still remains TM-polarized light. Thereafter, the TM-polarized light is rotated in its polarization orientation by 90 degrees when it passes through the liquid crystal layer 12, then passes through the color filter 6, and finally passes through the upper polarizer 2. Thus, in the transmission display section, the backlight 44 is transmitted to make bright display while in the reflection display section the external light 46 is reflected, so that images can be viewed even in the bright ambience as the external light 46 is reflected.

According to this embodiment, even though the WGP 18 is incorporated in the liquid crystal element 157, the provision of the light absorbing multi-film layer 62 can cause the amount of the TE-polarized light reflected from the WGP 18 in dark display to be reduced and therefore display having high contrast can be obtained even in the bright ambience.

In the transmission aperture 38, the TE-polarized light impinging on the WGP 18 is reflected from the WGP 18 and turned back toward the backlight source 28. The backlight 44, having entered the reflection display section 40, is reflected from the wavy reflecting layer 22 and turned back toward the backlight source 28. The light returned to the backlight source 28 is reflected from within the backlight source 28 and its most part comes out of the source backlight 28 to return toward the liquid crystal element 157. Accordingly, the maximum amount of the light that does not pass through the transmission aperture 38 can be returned to the backlight source 28 for reuse so that the amount of light passing through the transmission aperture 38 can be increased.

In the case where a polarizer plate is provided on that side of the liquid crystal element 157 which faces the backlight source 28, a reflection type polarizer is provided on that side of the polarizer plate which faces the backlight source 28. With this configuration, the polarized light, which may otherwise be absorbed in the polarizer plate, will be turned back toward the backlight source 28 to increase the brightness in display.

In this embodiment, the characteristics of the WGP 18 can enable the TE-polarized light, which is not passed through the WGP 18, to be reflected for reuse without the use of the reflection type polarizer. In such a case, as there is no need for a polarizer plate being attached to the outer surface of the liquid crystal element, a thin LCD device can be obtained. Further, the reuse of light is possible without additionally using a reflection type polarizer so that brightness can be improved in transmission display. Especially in the reflection display section, the direct reflection of light from the wavy reflecting layer 22 occurs and this situation eliminates light transmission through the polarizer or the reflection type polarizer so that the efficiency in use of the backlight 44 can be improved simply by enhancing the reflectivity of the wavy reflecting layer 22.

The liquid crystal element described in this embodiment is supposed to be driven by an active matrix, but the active matrix is not shown. In that driving configuration, the voltage applied to the comb-like pixel electrode 14 is switched by using TFTs (thin film transistors) provided in the reflection display section 40. The display mode used in this embodiment is the IPS mode wherein a common electrode for all the pixels and a comb-like pixel electrode provided in a layer different from the common electrode are used and the liquid crystal is driven by the electric field formed therein due to the potential difference between the common electrode and the comb-like pixel electrode. In this case, the WGP 18 is used as the common electrode, and the comb-like pixel electrode 14 is provided in a layer different from the common electrode with an insulation layer 16 provided in between. Since the WGP 18 is used as an electrode, the metal wire components 30 are connected with one another by means of conductor at places that will not adversely affect the optical properties of the WGP 18, so that the WGP 18 may be kept at the same potential throughout. Thus, since the WGP 18 is used as the common electrode, a single element, i.e. WGP 18, can serve as both polarizer and electrode. This eliminates an additional provision of a common electrode, leading to the simplification of the structure of the liquid crystal element.

The pixel electrode 14 should preferably be made of transparent conductive material such as ITO or IZO, to provide a high transmittivity. A wire grid polarizer which can absorb TE-polarized light just as the WGP 18 does, may be used as the pixel electrode 14. The electric capacitance formed between the pixel electrode and the common electrode can be used as capacitances for pixels. The actual shape of the comb-like pixel electrode 14 may be such as that used for an ordinary IPS mode. The single element of the comb may be of straight or chevron form.

According to this embodiment, since a polarizer is incorporated in a liquid crystal element itself, both transmission and reflection displays can be performed without the aid of a retarder, by using a liquid crystal layer 12 having a constant gap. Moreover, although twisted liquid crystal is generally used in the transflective IPS mode, it is not necessary to use such twisted liquid crystal even in such a mode if a polarizer is incorporated inside the LCD element as according to this embodiment.

In this embodiment, the pixel electrode and the common electrode are separately provided, but it is also possible that a comb-like common electrode is provided in the same layer that serves as the pixel electrode 14, as seen in the pixel configuration used in the well-known IPS mode. In such a case, the WGP 18 need not function as an electrode.

A set of sub-pixels 36 provided with color filters for red (R), green (G) and blue (B) lights, constitutes a single pixel. Black matrices are interposed between juxtaposed sub-pixels to prevent chromatic mixture between adjacent sub-pixels. For monochromatic display or field sequential operation, there is no need for color filters. For multi-color display, as many sub-pixels have only to be provided according to the number of colors to be used in such display. Further, the transmission display section and the reflection display section may be provided with color filters having different thicknesses. For example, the reflection display section may use thinner color filters. The color filter 6 is flattened by using an overcoat layer 10.

Figure 9:
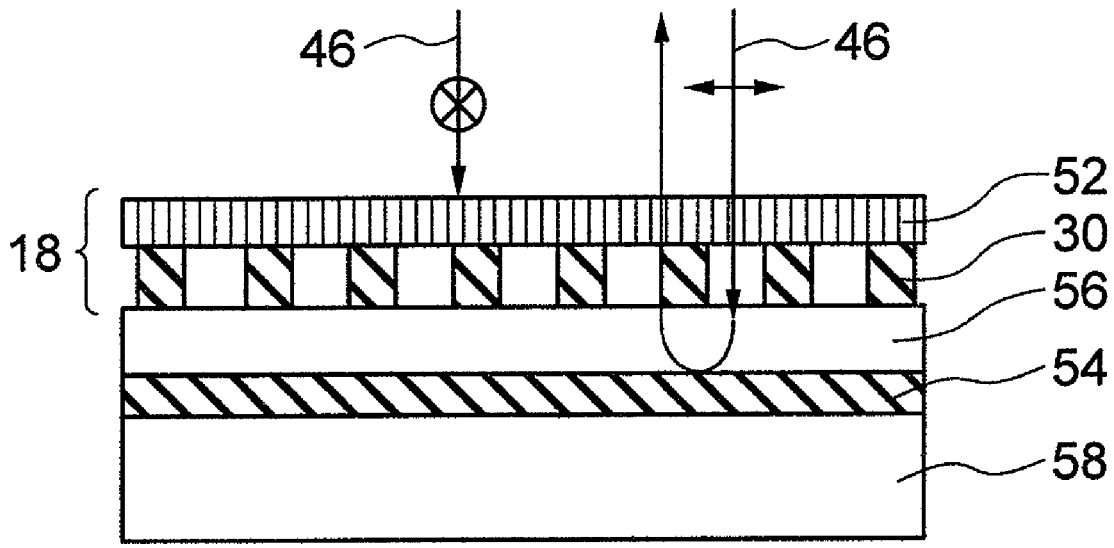
FIG. 9 shows a cross-section view of another example of WGP according to this invention.
Figure 10:
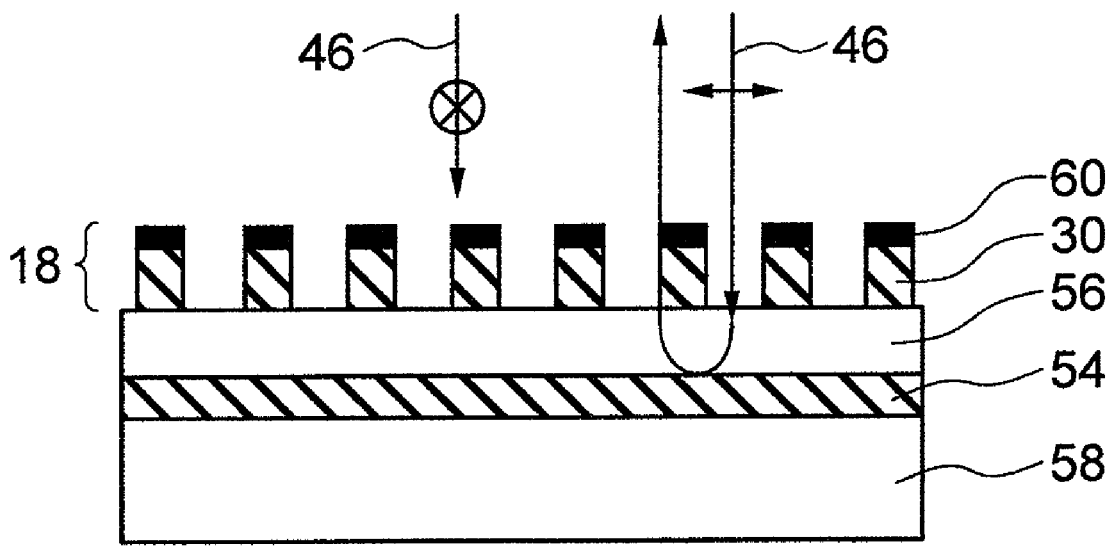
FIG. 10 shows a cross-section view of still another example of WGP according to this invention.

The WGP 18 used in this embodiment is characterized in that the TE-polarized light impinging on at least one surface of the WGP 18 is absorbed. The absorption of light mentioned here means that degree of absorption excels the other properties, i.e. transmittivity and reflectivity. In this embodiment, it is assumed that the degree of absorption is normally not less than 50%, and preferably not less than 90%. The light absorbing multi-film layer 62 is not a sole means for enhancing the absorption of TE-polarized light. FIGS. 9 and 10 show different configurations.

FIG. 9 shows a cross-section view of another example of WGP according to this invention, wherein a coating type polarizer layer 52 is substituted for the light absorbing multi-film layer 62. The coating type polarizer layer 52 is disposed on the metal wire layer 30 in such an orientation as to absorb TE-polarized light and transmit TM-polarized light. Thus, TM-polarized light is transmitted through the coating type polarizer layer 52 and the metal wire layer 30. In the reflection display section, the transmitted TM-polarized light is reflected from a reflection layer 54, passes through the metal wire layer 30 and the coating type polarizer layer 52, and is returned to the incident side. The coating type polarizer layer 52 may be fabricated by applying a suitable liquid under stress and then hardening the liquid to define its polarization orientation. If the polarization orientation is defined by applying stress, a layer of transparent material may be inserted between the coating type polarizer layer 52 and the metal wire layer 30. Since the metal wire layer 30 has a fine structure of parallel wire pieces, it can serve as an alignment layer. Therefore, if the coating type polarizer layer 52 is applied onto the metal wire layer 30 in direct contact therewith, the polarization orientation for the coating type polarizer layer 52 can be automatically resulted in. Accordingly, if the coating type polarizer layer 52 is used to absorb TE-polarized light, it has only to be applied uniformly all over. There is no need for rendering the application layer to fine linear pieces parallel to one another and to the parallel wire elements of the metal wire layer 30. Thus, the fabrication process can be much simplified. The coating type polarizer layer 52 is provided for the purpose of improving reflective contrast in the bright ambience by absorbing the TE-polarized component of the external light 46 impinging on the WGP 18. As the WGP 18 exhibits a high degree of polarization for transmitted light, the coating type polarizer layer 52 need not have a high degree of polarization, but it has only to have a degree of polarization that can at least provide a desired reflective contrast.

FIG. 10 shows a cross-section view of still another example of WGP according to this invention, wherein a light absorbing wire layer 60 is substituted for the light absorbing multi-film layer 62. The light absorbing wire layer 60 uses as its material such black substance as carbon black that well absorbs lights in the visible spectrum. The structure of the light absorbing wire layer 60 is similar to that of the metal wire layer 30, having fine parallel wire elements. The light absorbing wire layer 60 serves to absorb TE-polarized light. Material having a large light absorbing coefficient should preferably be used for the light absorbing wire layer 60. The light absorbing wire layer 60 is provided for the purpose of improving reflective contrast by absorbing the TE-polarized component of the external light 46 impinging on the WGP 18. The light absorbing wire layer 60 has only to have a degree of polarization that can at least provide a desired reflective contrast.

Figure 11:
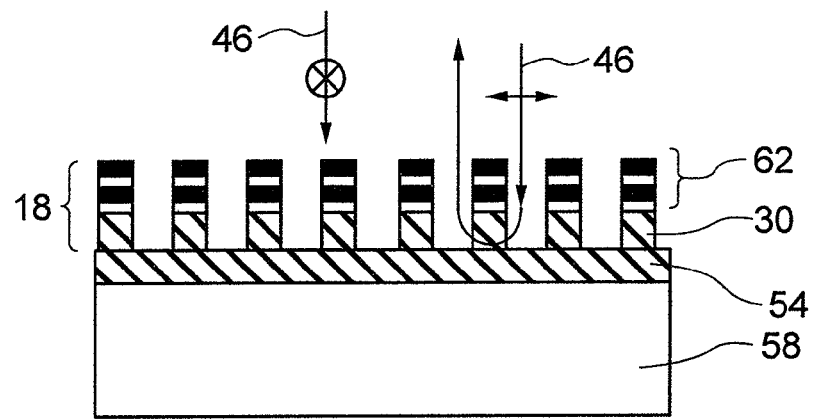
FIG. 11 shows a cross-section view of yet another example of WGP according to this invention.

FIG. 11 shows a cross-section view of yet another example of WGP according to this invention. In this example, the flattening layer is not used, but the metal wire layer 30 is formed directly on the reflection layer 54. In this case, the reflection layer 54 and the metal wire layer 30 can be made of the same material such as aluminum. In this case, the transparent dielectric layer 56, which is provided between the reflection layer 54 and the metal wire layer 30 in the previously described example, can be dispensed with, and TM-polarized light can still be reflected as in the case where the transparent dielectric layer 56 is provided. In order to obtain a desired distribution of reflection angles, the reflection layer 54 should preferably have a wavy surface. However, if a light scattering function is separately provided by using a light scattering member, the surface of the reflection layer 54 may be flat. By forming the metal wire layer 30 on and in contact with the reflection layer 54, the wire elements of the metal wire layer 30 can be electrically connected with one another automatically and therefore the wire elements of the layer 30 need not be electrically connected with one another by means of any specific conductor. Namely, the WGP 18 can be regarded as a common electrode kept as the same potential throughout.

The WGP 18 used in this embodiment is fabricated of inorganic material and therefore has a high thermal resistance. Hence, it does not degrade under high and low temperatures and therefore exhibits a high environmental stability.

Embodiment 2

The second embodiment of this invention will now be described with reference to FIG. 12.

Figure 12:
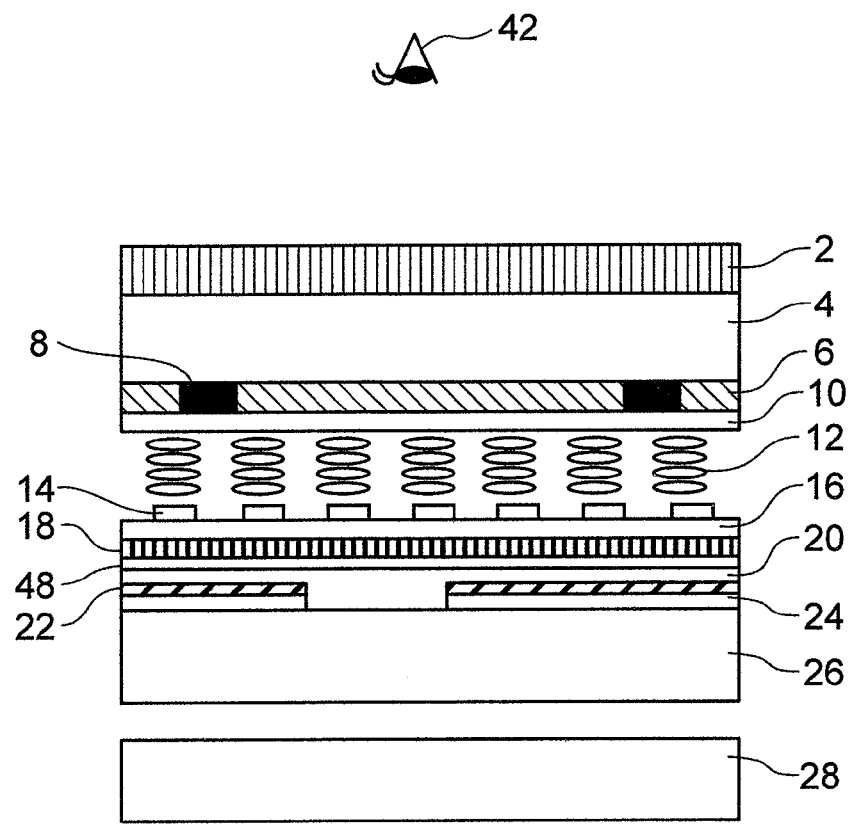
FIG. 12 shows a cross-section view of a liquid crystal display device as a second embodiment of this invention.

FIG. 12 shows a cross-section view of a liquid crystal display device as a second embodiment of this invention. This second embodiment is the same as the first embodiment described above except that a transparent common electrode 48 is provided on that surface of the metal wire layer 30 of the WGP 18 which faces the lower plate 26. Since the transparent common electrode 48 is provided in direct contact with the metal wire layer 30, the metal wire layer 30 can be maintained at the same potential throughout without separately providing electric connection among the metal wire components of the layer 30. Thus, by using transparent conductive material for the transparent common electrode 48, the sheet resistance of the transparent common electrode 48 can be reduced. The transparent common electrode 48 need not necessarily be in contact with the metal wire layer 30. Also, the transparent common electrode 48 may be provided on the upper side of the WGP 18, facing the liquid crystal layer 12.

Embodiment 3

The third embodiment of this invention will be described with reference to FIGS. 13 and 14.

Figure 13:
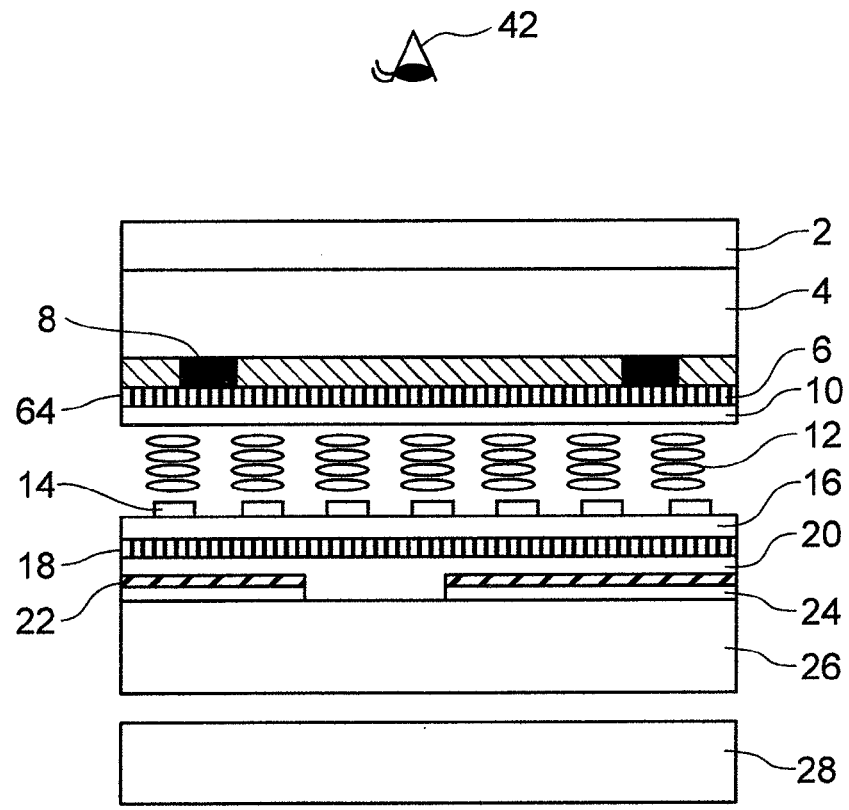
FIG. 13 shows a cross-section view of a liquid crystal display device as a third embodiment of this invention.
Figure 14:
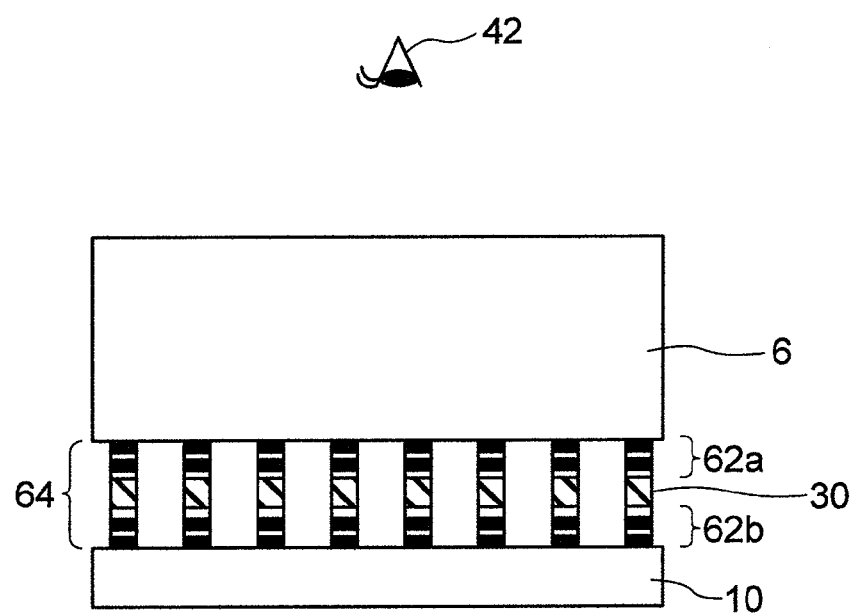
FIG. 14 shows a cross-section view of the upper WGP of the liquid crystal display device as a third embodiment of this invention.

FIG. 13 shows a cross-section view of a liquid crystal display device as a third embodiment of this invention. This third embodiment is the same as the first embodiment described above except that the upper polarizer 2 is replaced by an upper wire grid polarizer 64 (hereafter referred to as upper WGP). The upper WGP 64 is provided on that surface of the color filter 6 which faces the liquid crystal layer 12. FIG. 14 shows a cross-section view of the upper WGP of the liquid crystal display device as a third embodiment of this invention. To absorb the TE-polarized component of the external light, light absorbing multi-film layers 62a and 62b are provided on those surfaces of the metal wire layer 30 which face the viewer's eyes 42 and the liquid crystal layer 12, respectively. The provision of the light absorbing multi-film layer 62b can prevent the degradation of contrast due to the TM-polarized component passing through the upper WGP 64, the TM-polarized component being generated as a result of the alteration into TM-polarized light of a fractional amount of TE-polarized light reflected between the WGP 18 and the upper WGP 64. If the degradation of contrast doesn't cause any trouble, the light absorbing multi-film layer 62b need not be necessarily provided. The light absorbing multi-film layers 62a and 62b may be of the same structure or different structure. The metal wire layer 30 should preferably be fabricated of aluminum. The width, height and repetition interval of the metal wire components of the layer 30 must be suitably selected to provide a sufficient degree of polarization by transmission.

Thus, the provision of the upper WGP 64 on that side of the color filter 6 which faces the liquid crystal layer 12 can eliminate the influence on the liquid crystal layer 12 of the polarization cancellation occurring in the color filter 6. Accordingly, the degradation of contrast due to the polarization cancellation that may occur in the color filter 6 can be prevented so that high contrast display can be enjoyed. If the polarization cancellation occurring in the color filter 6 causes no problem, the upper WGP 64 may be located between the color filter 6 and the upper plate 4.

According to this embodiment where the upper polarizer 2 is replaced by the upper WGP 64 disposed on that side of the upper plate 4 which faces the liquid crystal layer 12, the pixel electrode and the common electrode should preferably be both located on the side of the lower plate 26. This structure is suited for the IPS mode.

According to this embodiment, since the upper polarizer that is attached externally to the LCD device in the case other than this, can be incorporated in the LCD device, the LCD device can be made thinner. Further, since the WGP 18 and the upper WGP 64 used in this embodiment are both built of inorganic material, they have a high thermal resistance. The LCD device according to this embodiment, therefore, rarely suffer from deterioration under high and low temperatures but exhibits an excellent environmental stability.

Embodiment 4

The fourth embodiment of this invention will be described with reference to FIGS. 15 and 16.

Figure 15:
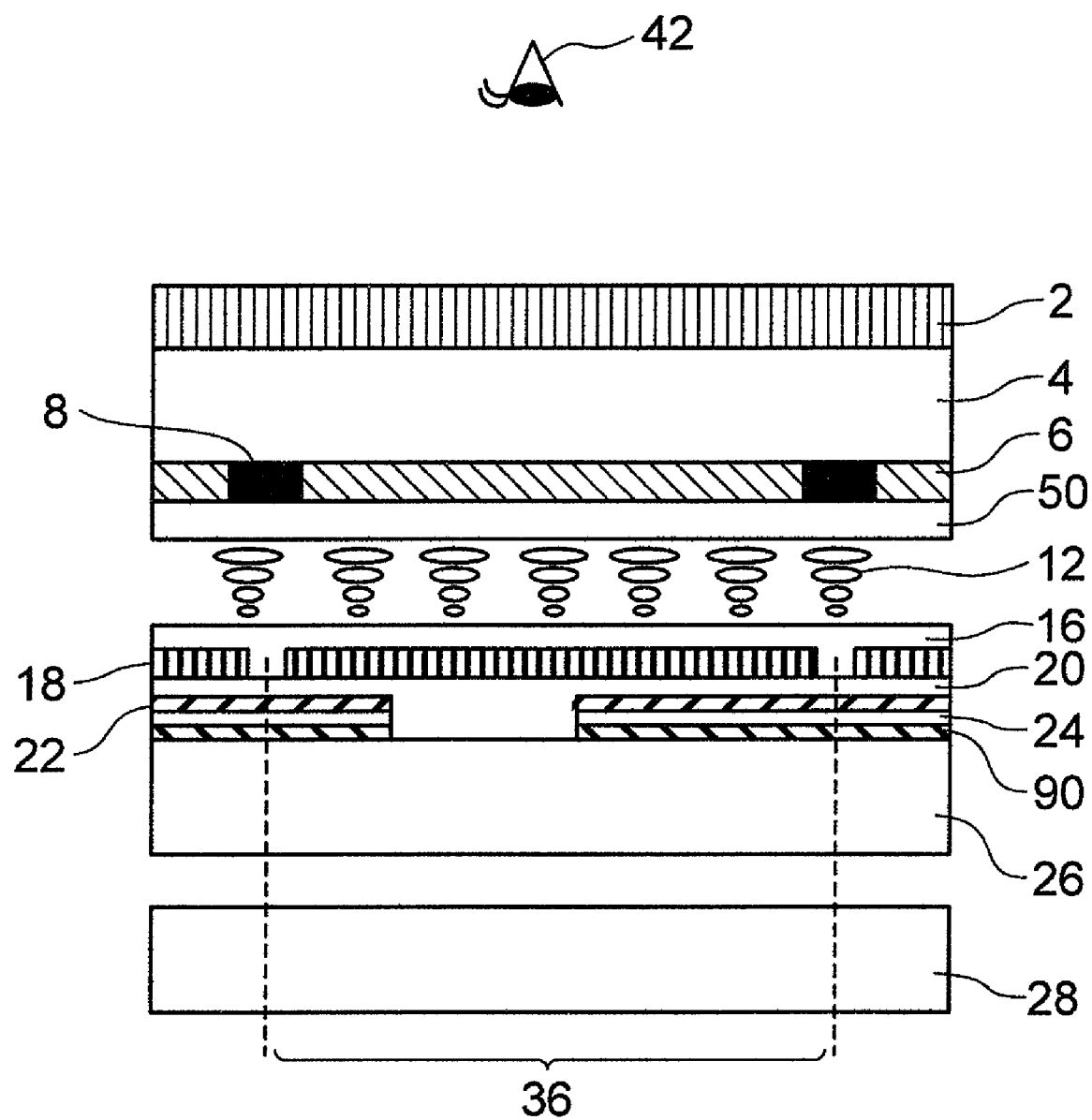
FIG. 15 shows a cross-section view of a liquid crystal display device as a fourth embodiment of this invention.

FIG. 15 shows a cross-section view of a liquid crystal display device as a fourth embodiment of this invention. This embodiment uses the twisted nematic (TN) mode. Accordingly, a transparent electrode 50 to serve as the common electrode is provided close to the inside surface of the upper plate 4. The WGP 18 is divided into discrete portions which are paired respectively with as many sub-pixels 36 and the discrete portions are used as pixel electrodes, which are driven by TFTs (not shown). In each discrete WGP 18 in a sub-pixel, the wire elements are electrically connected with one another so as to maintain all of them at the same potential as in the embodiments described above. A voltage is applied between the WGP 18 (first electrode) and the transparent electrode 50 (second electrode) and the resulting longitudinal electric field established across the liquid crystal layer 12 switches the liquid crystal inside thereof. In this embodiment, since the liquid crystal element operates in the normally closed mode, the combined effect of the upper polarizer 2 and the WGP 18 blocks light transmission in the absence of an applied voltage. When a voltage is applied between the transparent electrode 50 and the WGP 18, the liquid crystal molecules of the liquid crystal layer 12 rotate so that the light having passed through the WGP 18 then passes through the upper polarizer 2 to provide white display. Since the WGP 18 is divided into the discrete portions which are paired with the sub-pixels 36, the gap between discrete portions is filled with black matrix 8 to block the light leading to the degradation of contrast.

Thus, the WGP 18 can be used as the pixel electrode and therefore there is no need for providing a separate pixel electrode. The wire elements of the metal wire layer 30 may be electrically connected with one another by the use of transparent conductive material as in the second embodiment described above. As in this embodiment, since the longitudinal electric field is used, the pixel electrode and the common electrode can be disposed on separate plates so that the layer structure of the WGP 18 provided on the inside surface of the lower plate 26 can be simplified.

Figure 16:
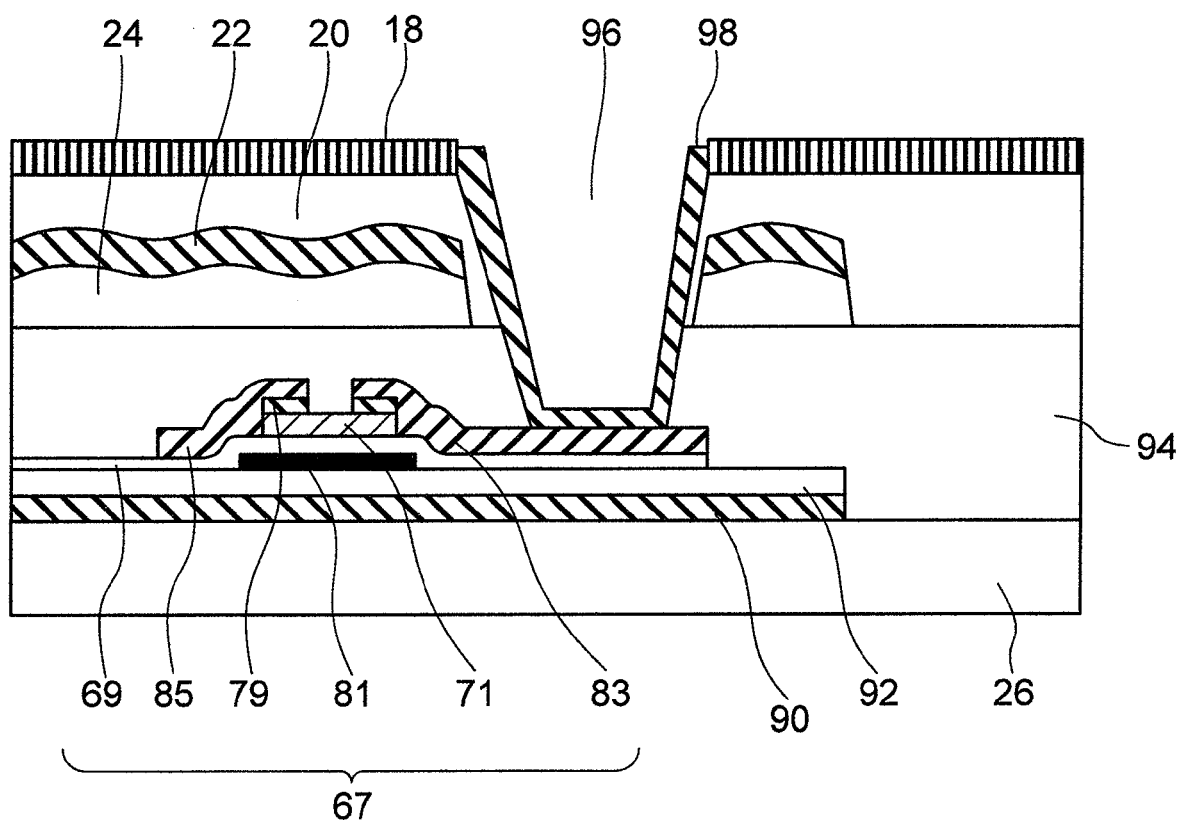
FIG. 16 shows a cross-section view of the TFT and its peripherals in the fourth embodiment of this invention.

FIG. 16 shows a cross-section view of the TFT and its peripherals in the fourth embodiment of this invention. In this embodiment, a switching element is constructed as a TFT 67 using amorphous silicon (a-Si). A gate electrode 81 of the TFT 67 is formed above a lower plate 26 of glass. Material used for the gate electrode 81 includes metals having high melting temperatures such as tantalum Ta, molybdenum-tantalum MoTa, molybdenum-tungsten MoW, tungsten W, molybdenum Mo, etc. An insulation film 69 of silicon oxide (SiOx) or silicon nitride (SiNx) is formed on the gate electrode 81. Amorphous silicon film 71 is formed on that part of the insulation film 69 which lies on the gate electrode 81. N+ silicon layers 79 are formed on the amorphous silicon film 71, and a source electrode 83 and a drain electrode 85 are formed with metal layers such as aluminum. The source electrode 83 is electrically connected via a through-hole 96 with the WGP 18 used as pixel electrode. A metal layer 98 is formed on the surface of the through-hole 96 and the metal layer 98 actually connects the source electrode 83 electrically with the WGP 18. The material for the metal layer 98 may be the same as that for the metal wire layer 30 of the WGP 18. In such a case, the metal layer 98 can be formed when the WGP 18 is fabricated. A channel is formed such that the source electrode 83 and the drain electrode 85 are separated from each other, to complete the TFT 67. The TFT 67 does not necessarily require the use of amorphous silicon, but may be fabricated using poly-silicon (p-Si) or single crystal silicon. The TFT may also be fabricated with organic material. Further, the structure of the TFT need not be restricted to the bottom gate type as used in this embodiment, but may be of any other types of TFT.

In this embodiment, a rear reflector layer 90 is provided between the TFT 67 of the reflection display section 40 and the lower plate 26. As a result of the provision of the rear reflector layer 90, the backlight can be prevented from impinging on the TFT 67. Moreover, the rear reflector layer 90, which is usually flat, causes the backlight to be specularly reflected from its flat surface, and to turn the reflected light back toward the backlight source, thereby increasing the amount of light to be reused. Material having a high reflectivity such as aluminum or silver should preferably be used for the rear reflector layer 90.

Embodiment 5

The fifth embodiment of this invention will be described with reference to FIG. 17.

Figure 17:
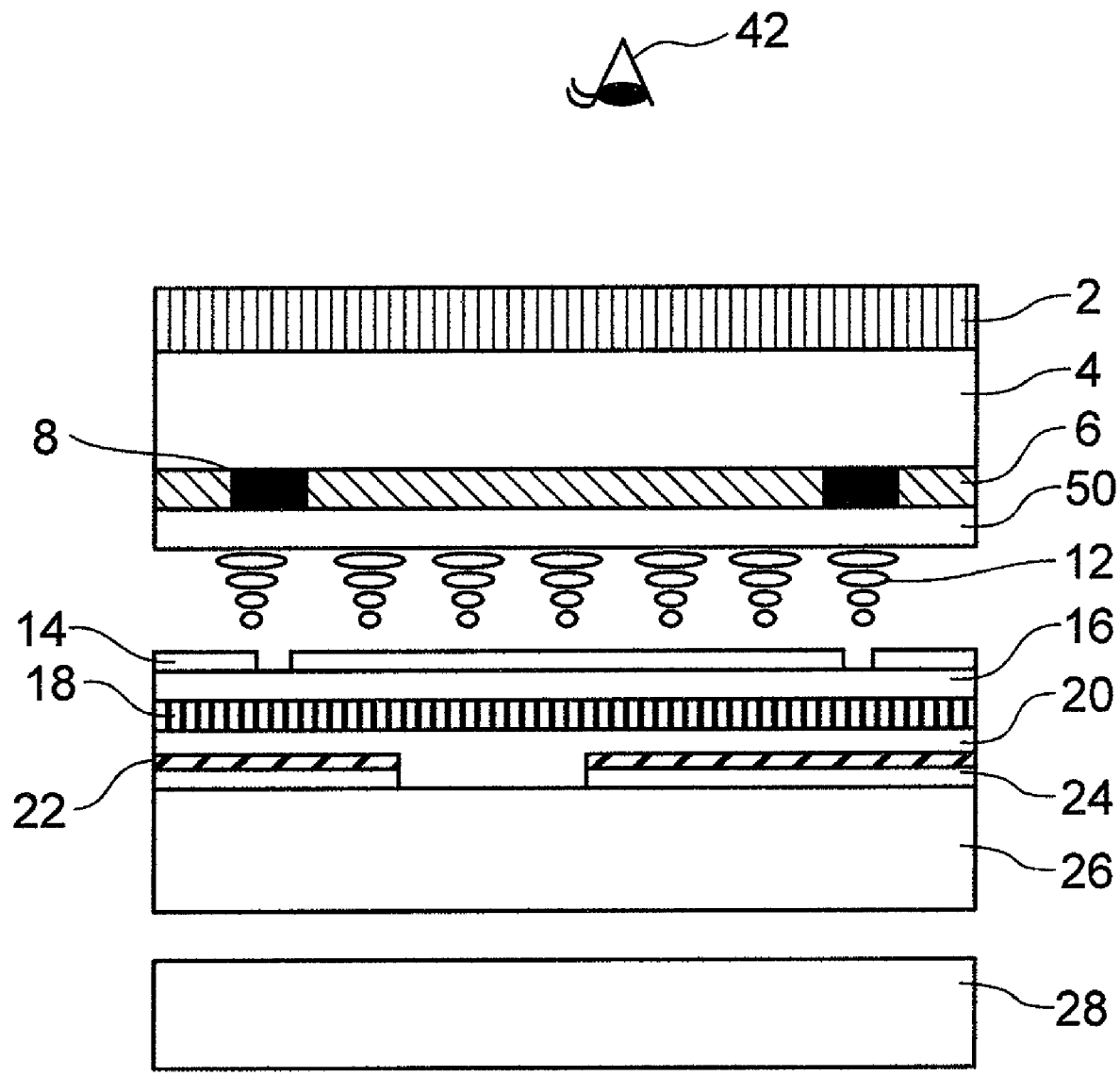
FIG. 17 shows a cross-section view of a liquid crystal display device as a fifth embodiment of this invention.

FIG. 17 shows a cross-section view of a liquid crystal display device as a fifth embodiment of this invention. This liquid crystal display device is the same as that described above as the fourth embodiment of this invention except that the pixel electrode 14 is provided on that side of the liquid crystal layer 12 which faces the WGP 18 and on the insulation layer 16 disposed on the WGP 18. The liquid crystal layer 12 is of TN mode. The liquid crystal of the layer 12 is switched with the voltage applied between the transparent electrode 50 disposed on that surface of the layer 12 which faces the upper plate 4 and the pixel electrode 14 driven by the TFT. By forming the pixel electrode 14 separately from the WGP 18, the WGP 18 can be extended all over the liquid crystal layer 12 so that degradation in contrast that may otherwise occur from one sub-pixel to another can be avoided.

Embodiment 6

The sixth embodiment of this invention will be described with reference to FIG. 18.

Figure 18:
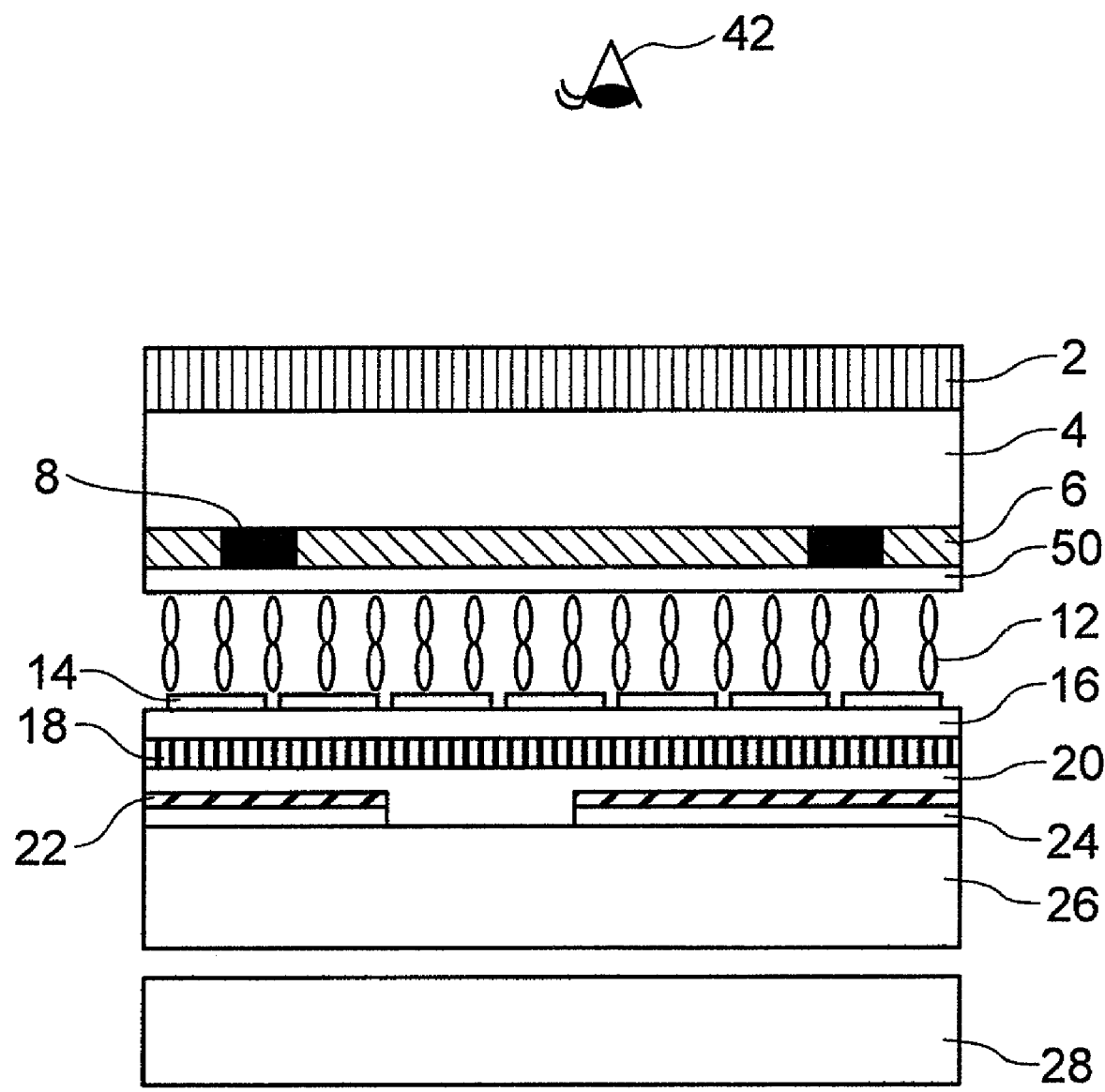
FIG. 18 shows a cross-section view of a liquid crystal display device as a sixth embodiment of this invention.

FIG. 18 shows a cross-section view of a liquid crystal display device as a sixth embodiment of this invention. This liquid crystal display device is the same as that described above as the fifth embodiment of this invention except that the structure of the pixel electrode 14 is different and that the liquid crystal is of vertical align (VA) mode. The structure of the pixel electrode 14 is such that the liquid crystal layer 12 can be divided into plural domains and that the viewing angle can be increased. Since the WGP 18 can provide a high degree of polarization even for slant impinging light, it is said to be suitable for a wide view angle display mode such as VA or IPS mode. However, it is noted that the WGP 18 thus fabricated should not necessarily be restricted to the use for a wide view angle display mode, but that it may be used for any other display modes.

Embodiment 7

The seventh embodiment of this invention will be described with reference to FIG. 19.

Figure 19:
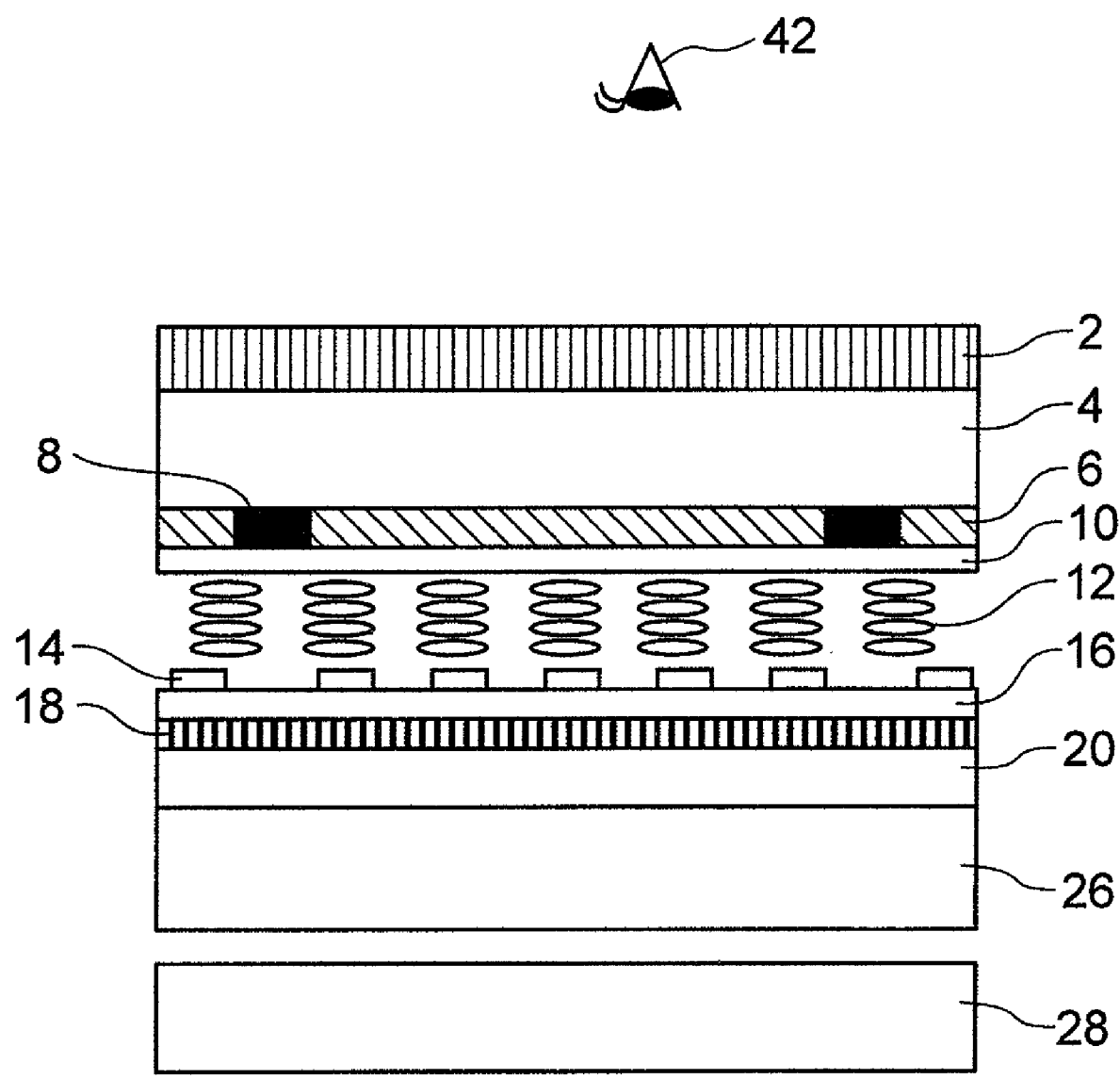
FIG. 19 shows a cross-section view of a liquid crystal display device as a seventh embodiment of this invention.

FIG. 19 shows a cross-section view of a liquid crystal display device as a seventh embodiment of this invention. This liquid crystal display device is the same as that described above as the first embodiment of this invention except that the wavy layer and the wavy reflecting layer are not provided and that the display is of transmission type. Although the liquid crystal display device is of transmission type, if the WGP 18 is provided with the light absorbing multi-film layer 62, then the degradation of image quality due to the lowering of contrast in the bright ambience can be avoided. Further, the provision of the WGP 18 in the liquid crystal display element can eliminate the cause of contrast degradation due to the light reflection from the wiring conductors laid between the WGP 18 and the lower plate 26.

Embodiment 8

The eighth embodiment of this invention will be described with reference to FIG. 20.

Figure 20:
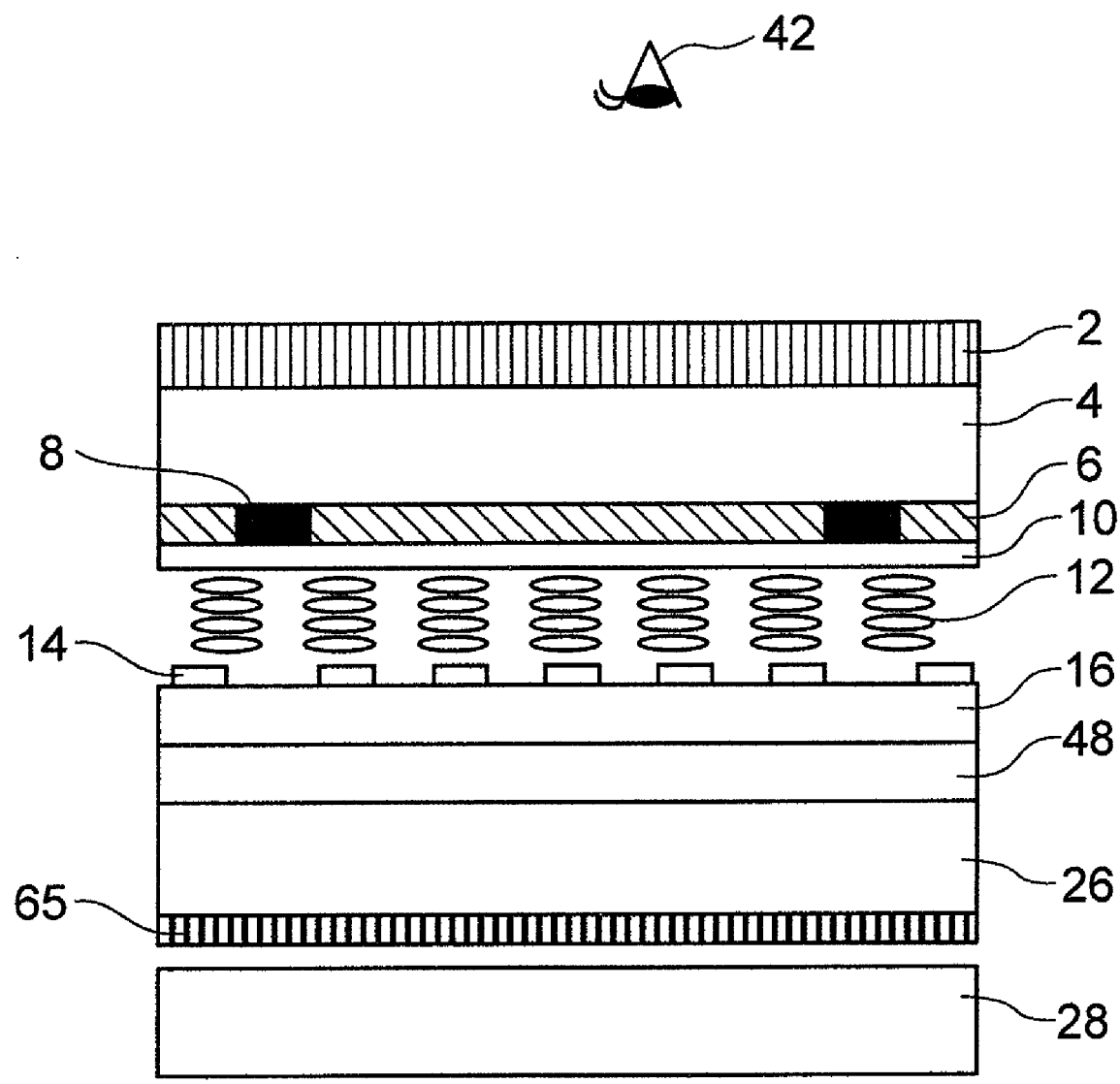
FIG. 20 shows a cross-section view of a liquid crystal display device as a eighth embodiment of this invention.

FIG. 20 shows a cross-section view of a liquid crystal display device as an eighth embodiment of this invention. This liquid crystal display device is of transmission type and the same as that described above as the seventh embodiment of this invention except that an externally attached wire grid polarizer (hereafter referred to as "external WGP") 65 is disposed on that surface of the lower plate 26 which faces the backlight source 28 and that a transparent common electrode 48 of transparent conductive material is additionally provided. As in the first embodiment, the external WGP 65 has on its surface facing the lower plate 26 a light absorbing multi-film layer (not shown) to absorb the TE-polarized component of the external light. The TE-polarized light impinging on the external WGP 65 from the side of the backlight source 28 is reflected from the external WGP 65 and turned back toward the backlight source 28. Thus, the external WGP 65 functions as an absorbing type polarizer equipped with a reflection type polarizer. Accordingly, the external WGP 65 of this embodiment can greatly suppress the degradation of contrast due to external light in the bright ambience as compared with a conventional liquid crystal display element with an ordinary wire grid polarizer attached externally. Moreover, with such a conventional liquid crystal display element with an ordinary wire grid polarizer attached externally, there will be adverse possibility that the light turned back toward the backlight source as a result of reflection from the wiring conductors in the liquid crystal display element is reflected from the wire grid polarizer and leaks toward the viewer's eyes, thereby lowering contrast even in the dark ambience. On the contrary, the external WGP 65 of this embodiment can absorb the TE-polarized light that may otherwise lower contrast as a result of reflection from the wiring conductors and therefore can also suppress the degradation of contrast in the dark ambience.

Since the external WGP 65 has only to be disposed on the flat surface of the lower plate 26, its fabrication process is simple. Alternatively, the film on which the external WGP 65 is formed may be attached to the lower plate 26. Even in such a case, the fabricated external WGP 65 itself can function as a polarizer with a reflection type polarizer element so that the thickness of this external WGP 65 can be halved as compared with the polarizer with a reflection type polarizer element which needs two sheets of film. Accordingly, the liquid crystal display element incorporating the external WGP 65 therein can be built thin. Alternatively, the external WGP 65 formed on a sheet may be transferred onto the outer surface of the lower plate 26.

Embodiment 9

The ninth embodiment of this invention will be described with reference to FIG. 21.

Figure 21:
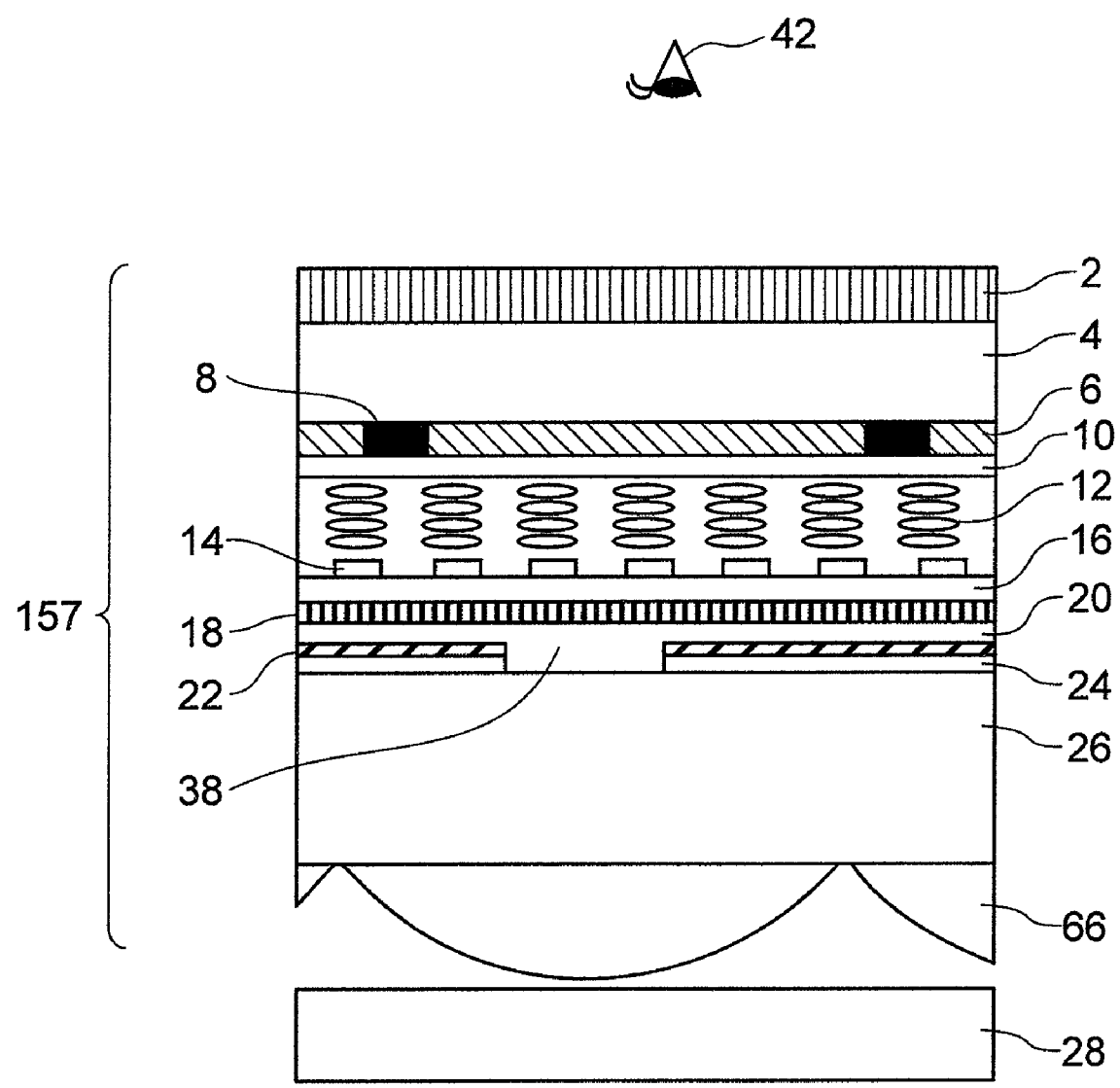
FIG. 21 shows a cross-section view of a liquid crystal display device as a ninth embodiment of this invention.

FIG. 21 shows a cross-section view of a liquid crystal display device as a ninth embodiment of this invention. Also in this embodiment a liquid crystal display element is used that is identical with the liquid crystal display element 157 used in the first embodiment of this invention. This embodiment, however, is characterized by the provision of a microlens array covering transmission apertures 38. The microlens array according to this embodiment is realized in the form of a lenticular lens 66 disposed on that surface of the lower plate which faces the backlight source 28. The lenticular lens 66 condenses the backlight from the source 28 onto the transmission aperture 38 so that the amount of light passing through the transmission aperture 38 can be increased.

In order for the lenticular lense 66 as a light condenser to work effectively and for the amount of light passing through the transmission aperture 38 to be increased, it is necessary for the rays of light emanating from the backlight source 28 to have narrow divergence angles, that is, to have a high degree of collimation. Therefore, the divergence angles should fall within a range of ±7°, and preferably of ±5°. In general, the angle at which brightness becomes equal to half the maximum brightness is used as the "viewing angle by brightness" (divergence angle). The actual viewing angle (divergence angle) can be determined according to the viewing angle by brightness.

The pixels are in the two dimensional periodic arrangement and each pixel consists of individual tricolor sub-pixels of R, G and B. The sub-pixels are lined in the horizontal direction when the LCD panel is viewed from the front side. Accordingly, the longitudinal axis of each lenticular lens element is also horizontal, parallel to the line of the sub-pixels, so that each lenticular lens element has a curvature in the vertical direction. This arrangement of lenticular lense 66 allows the backlight from the source 28 to be strongly collimated in the vertical direction and to diverge with a wide angle of emission in the horizontal direction. To obtain a desired viewing angle for the horizontal direction, it is preferable to control the diverging angle of the backlight from the source 28 in any suitable manner.

In order to condense light onto the transmission aperture 38 effectively, the curvature of each element of the lenticular lens 66 should preferably be aspherical. Especially, when the lower plate 26 is thin and the radius of curvature of each element of the lenticular lens 66 is small, the use of aspherical curvature is highly effective. However, spherical curvature may also be employed for the lenticular lenses 66 if the whole system assures a tolerable degree of light condensation with lenticular lens having spherical curvature. It is well known that if the curvature of the central portion of each element of the lenticular lens 66 is made approximately flat, then the brightness of the light passing through the transmission aperture 38 as viewed from the front side can be increased. This well-known teaching may, of course, be employed in this invention.

In this embodiment, the lenticular lens 66 is formed on the lower plate 26. Alternatively, the lenticular lens 66 may be formed on any other suitable member, e.g. the backlight source 28. Further, the lenticular lens 66 may be covered with transparent material having refractive index different from that of the material for the lenticular lens 66 so that the upper surface of the lenticular lens 66 layer may become flat.

The lenticular lens 66 itself can have a light dispersion property if the widths, heights and curvatures of the elements of the lenticular lens 66 are changed randomly. If the width and height of each element of the lenticular lens 66 is changed with the curvature kept unchanged, the focal length of the lenticular lens 66 remains unchanged so that light can diverged in the direction perpendicular to the direction in which the lenticular lens 66 condenses light. This configuration is particularly preferable.

If a polarizer in the form of a plate is substituted for the WGP 18 and disposed on that side of the lenticular lens 66 which faces the backlight source 28 and if the focal length of each element of the lenticular lens 66 is short, then the polarization orientation of the light passing through the lenticular lens 66 is changed, this leading to the degradation of transmission contrast. Further, if a polarizer is inserted between the lenticular lens 66 and the lower plate 26, contrast degradation can indeed be avoided, but this configuration increases the distance from the lenticular lens 66 to the transmission aperture 38 so that a sufficient effect of light condensation cannot be obtained especially in case where high resolution is required.

As described above with this embodiment, the incorporation of the WGP 18 in the LCD display element 157 can eliminate the contrast degradation due to the lenticular lenses 66 and therefore provide high contrast display. Further, the proposed configuration enables the distance from the lenticular lens 66 to the transmission aperture 38 to be short enough and therefore can be said to be suitable for display with high resolution. For example, in case of an application to the LCD display device used in a portable telephone set having its view window of not more than three inches, the proposed configuration is especially suitable to develop resolution higher than that attained by VGA, and in that case the thickness of the lower plate 26 should be not more than 0.4 mm, and preferably not more than 0.2 mm.

Embodiment 10

The tenth embodiment of this invention will be described with reference to FIG. 22.

Figure 22:
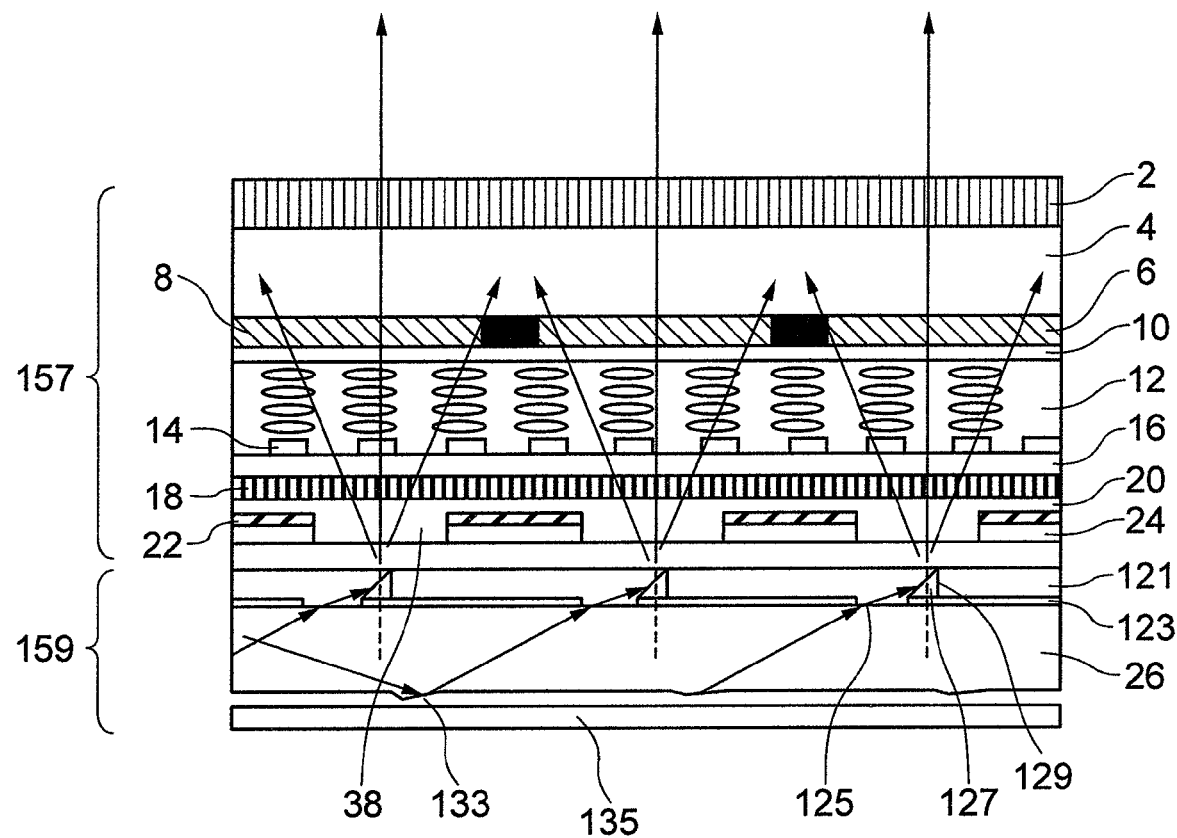
FIG. 22 shows a cross-section view of a liquid crystal display device as a tenth embodiment of this invention.

FIG. 22 shows a cross-section view of a liquid crystal display device as a tenth embodiment of this invention. This embodiment uses an LCD element identical with the LCD element 157 used in the first embodiment of this invention. Further, the lower plate 26 is used as a light guiding plate for backlight in this embodiment. Light emitted from an LED (not shown) is totally reflected from the interface between the lower plate 26 and a second layer 123 of low refractive index, and travels through the lower plate 26. In light extraction openings 125, the lower plate 26 comes in contact with a first layer 121 of low refractive index, and the light is retrieved toward the LCD element 157 through the light extraction openings 125. The light extraction openings 125 and reflectors 127 are provided corresponding in position to the transmission apertures 38. The light rays having passed through the light extraction openings 125 are reflected from the reflective layers 129 of the reflectors 127 and cast upon the transmission apertures 38. The light rays impinging on the WGP 18 are converted into polarized light. The polarized light has its orientation of polarization switched while passing through the liquid crystal layer 12, so that images can be displayed. By locating the reflectors 127 in the vicinity of the transmission apertures 38, and thereby improving the directionality of the light emitted from the backlight source assembly 159, the effective amount of light passing through the transmission apertures 38 can be increased.

The light emitted from the backlight source (not shown) is totally reflected from the interface between the lower plate 26 and the second layer 123 of low refractive index, travels through the lower plate 26, and enters the first layer 121 of low refractive index at the light extraction openings 125. In order for the light emitted from the backlight source to advance in this way, the lower plate 26, the first layer 121 of low refractive index and the second layer 123 of low refractive index must have refractive indices of n1, n2 and n3, respectively, where n1>n2>n3. A desired viewing angle can be obtained by suitably selecting values for these refractive indices.

Only light rays having large propagation angles can exit out of the lower plate 26 and light rays having small propagation angles remain captured in the lower plate 26. Accordingly, as light propagates through the lower plate 26, the proportion of light rays having small propagation angles confined in the lower plate 26 increases, and resultingly the amount of light rays exiting out of the lower plate 26 decreases. In order to cope with this situation, therefore, reflecting grooves 133 are provided on that surface of the lower plate 26 which is opposite to the surface facing the first layer 121 of low refractivity, so that the brightness due to the light rays exiting out of the light extraction openings 125 of the backlight source assembly 159 can be made uniform all over the lower plate 26. The uniformity in brightness all over the lower plate 26 can actually be obtained by controlling the depth and slope angle of each reflecting groove 133 and the interval of the reflecting grooves 133.

When the reflectors 127 receive light rays coming from anywhere other than through the light extraction openings 125, light loss occurs. As described above, however, light rays emitted from the backlight source travel through the lower plate 26 while being subjected to total reflections from the interface between the lower plate 26 and the second layer 123 of low refractive index, and no light rays pass through the second layer 123 of low refractive index to directly fall upon the reflectors 127. Accordingly, this configuration eliminates the light loss in the backlight source assembly 159 due to the provision of reflectors 127. The light rays reflected from the reflectors 127 always leave the backlight source assembly 159 and the light rays are generally reflected only once by the reflective layers 129 before leaving the backlight source assembly 159. Thus, even if the reflective layers 129 are made of metal film, the resulting light loss can be suppressed to a great extent. The slope of each reflector layer 127 may be determined such that the light rays can be oriented in a desired direction. The slope may preferably be 45° in order for the light rays nearly parallel to the lower plate 26 and exiting out of the light extraction openings 125 to be reflected by the reflectors 127 in a direction nearly perpendicular to the lower plate 26.

The first and second layers 121 and 123 of low refractive index can be formed by applying transparent resinous material of liquid phase on the surface of interest and then hardening the liquid resin layer. Also, inorganic transparent material may be used for the layers 121 and 123. The light extraction openings 125 can be formed by using photosensitive material for the second layers 123 of low refractive index and exposing the photosensitive material to light during photo-curing process to form patterns. The photolithography may also be used for the same purpose. Further, the second layer 123 of low refractive index having the light extraction openings 125 may be formed on the lower plate 26 through a printing method.

The reflectors 127 may be formed by using photosensitive material, controlling the irradiation amount of light onto the photosensitive material, and shaping the photosensitive material into a triangular prism. Alternatively, the reflectors 127 may be formed by cutting grooves having a triangular cross section in the first layer 121 of low refractive index, forming reflective layers 129 on the sloped surfaces of the triangular grooves and applying the grooved first layer 121 onto the second layer 123 of low refractive index formed on the lower plate 26. When the reflectors 127 are formed on the second layer 123 of low refractive index, the triangular prism shapes are first formed and the reflective layers 129 are then formed on the slope surfaces of the reflectors 127.

The light extraction openings 125 and the reflectors 127 are periodically provided corresponding in position to the transmission apertures 38. The open areas of the light extraction openings 125 are adjusted such that the open areas become larger as the distance increases from the LED serving as the backlight source, that is, the open area of a light extraction opening near to the LED is smaller than that of a light extraction opening remote from the LCD. This configuration can securely eliminate the brightness gradient that may otherwise occur with the distance from the LED. The amount of light extracted from the backlight source assembly 159 can thus be controlled by controlling the heights and widths of the reflectors 127 as well as the geometry of the light extraction openings 125.

According to this embodiment, the WGP 18 having a light absorbing multi-film layer for absorbing TE-polarized light is provided internally close the liquid crystal layer 12. Accordingly, even if the backlight source assembly 159 and the LCD element 157 are integrally combined, the degradation of contrast in the bright ambience can be avoided and the TE-polarized light can be reflected for reuse by the WGP 18. Therefore, as described in this embodiment, a transparent plate can be used as a light guiding channel. Further, with this configuration, since the backlight source assembly 159 and the LCD element 157 can be integrally combined while maintaining high contrast and high light availability, the overall structure of the resulted LCD device can be simplified, and the resulted LCD device can be made thin.

Moreover, if the area of each transmission aperture 38 is made larger and a reflective film is provided on the upper surface of the second layer 123 of low refractive index, the external light impinging through the expanded transmission aperture 38 on the reflective film is reflected from the reflective film so that the reflected light can be used for reflection type display. Thus, the so-called "display by slight reflection" can be performed with an LCD element of transmission type. TFTs may be separately formed and then transferred onto the lower plate 26. Organic TFTs may also be employed that are formed using organic material.

The structure of the backlight source assembly 159 using the lower plate 26 as a light guiding channel is by no means limited to that described in this embodiment, but it is still preferable to provide material of low refractive index having a refractive index smaller than that of the lower plate 26 between the WGP 18 and the lower plate 26 in order for the lower plate 26 to serve as a light guiding structure. The description made hitherto has been in the case of the normally black mode of LCD operation. It is needless to say that this invention can be well applied to the normally white mode of LCD operation wherein display is white when no voltage is applied to the liquid crystal layer. Further, this invention can be applied to other display modes than described in this specification. Moreover, if necessary depending on the modes of display, a retarder may be used or the cell gap in the transmission display section may be made different from that in the reflection display section. Furthermore, if necessary, an external polarizer may be used in addition to the internal WGP 18.

The foregoing embodiments have been described as adapted to the active matrix drive, but they can of course be adapted to the passive matrix drive.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device comprising:
a first transparent plate having a first polarizer;
a second transparent plate having a second polarizer and disposed opposite to the first transparent plate;
a liquid crystal layer hermetically sealed and interposed between the first transparent plate and the second transparent plate, for constituting plural pixels;
first and second electrodes for driving the liquid crystal layer;
light transmission sections, each being formed corresponding to at least a part of the pixel;
wherein the first polarizer is a wire grid polarizer, and a light absorbing layer for absorbing TE-polarized light is provided on a surface of the wire grid polarizer which faces the liquid crystal layer;
wherein the light absorbing layer includes a plurality of stacked pairs of a dielectric wire layer and a metal wire layer which absorbs light vertically stacked on the surface of the wire grid polarizer; and
wherein a width of each wire of the wire grid polarizer is not more than 50% of a repetition interval of the wire grid polarizer.

2. A liquid crystal display device as claimed in claim 1, wherein the wire grid polarizer is used as the first electrode.

3. A liquid crystal display device as claimed in claim 2, wherein the first electrode is used as a pixel electrode, the second electrode is used as a common electrode, and the first electrode is electrically connected with a switching element, thereby potential difference being developed between the switching element and the second electrode.

4. A liquid crystal display device as claimed in claim 1, wherein the wire grid polarizer, the first electrode and the second electrode are arranged in this order mentioned.

5. A liquid crystal display device as claimed in claim 1, further comprising a reflection display section for making display by changing reflectivity by means of the liquid crystal layer driven by the potential difference between the first and the second electrode, wherein the reflection display section operates as reflection display by reflecting the external light transmitted through the first polarizer, wherein the reflection display section has a reflective layer for reflecting the light transmitted through the first polarizer, and wherein the wire grid polarizer is formed directly on the reflective layer or formed on the reflective layer by with a dielectric layer interposed therebetween.

6. A liquid crystal display device as claimed in claim 5, wherein the reflective layer reflects backlight, and the reflective layer is provided on the opposite side of the light absorbing layer with respect to the wire grid polarizer of the first polarizer.

7. A liquid crystal display device as claimed in claim 6, wherein the reflective layer has a wavy surface.

8. A liquid crystal display device as claimed in claim 1, wherein the second polarizer is a wire grid polarizer, and another light absorbing layer to absorb TE polarized light is disposed on a viewer's eye side of the second polarizer.

9. A liquid crystal display device as claimed in claim 1, further comprising a planar light emitting element, wherein a lens array is provided between the planar light emitting element and the first transparent plate.

10. A liquid crystal display device as claimed in claim 1, wherein the first electrode is used as a common electrode, the second electrode is used as a pixel electrode, the first electrode and the second electrode with an insulation layer interposed between them are disposed on the first transparent plate, and the wire grid polarizer is disposed on the first electrode.

11. A liquid crystal display device as claimed in claim 10, wherein the wire grid polarizer is in contact with the first electrode.

12. A liquid crystal display device as claimed in claim 10, wherein the wire grid polarizer layer comprises a metal wire layer, and the light absorbing layer is formed on a surface of the metal wire layer which faces the liquid crystal layer.

13. A liquid crystal display device as claimed in claim 1, wherein the wire grid polarizer with the light absorbing layer enables reduction of reflectivity of the TE-polarized light and an increase of reflectivity of TM-polarized light.

14. A liquid crystal display device as claimed in claim 1, wherein the wire grid polarizer enables transmittance of at least 50% of TM-polarized light over at least an entire wavelength range of 0.4 to 0.5 μm.

15. A liquid crystal display device as claimed in claim 1, wherein the dielectric wire layer absorbs light.

16. A liquid crystal display device comprising:
a first transparent plate having a first polarizer;
a second transparent plate having a second polarizer and disposed opposite to the first transparent plate;
a liquid crystal layer hermetically sealed and interposed between the first transparent plate and the second transparent plate, for constituting plural pixels;
first and second electrodes for driving the liquid crystal layer;
light transmission sections, each being formed corresponding to at least a part of the pixel;
wherein the first polarizer is a wire grid polarizer, and a light absorbing layer for absorbing TE-polarized light provided on a surface of the wire grid polarizer which faces the liquid crystal layer;
wherein the wire grid polarizer is used as the first electrode; and
wherein the first electrode is used as a common electrode, the second electrode is used as a pixel electrode, and the first electrode and the second electrode with an insulation layer interposed between them are disposed on the first transparent plate.

17. A liquid crystal display device as claimed in claim 16, wherein a layer of transparent conductive material or metal is provided on the other surface of the wire grid polarizer.

18. A liquid crystal display device comprising:
a first transparent plate having a first polarizer;
a second transparent plate having a second polarizer and disposed opposite to the first transparent plate;
a liquid crystal layer hermetically sealed and interposed between the first transparent plate and the second transparent plate, for constituting plural pixels;
a first electrode and a second electrode for driving the liquid crystal layer; and
light transmission sections, each being formed corresponding to at least a part of the pixel,
wherein the first polarizer is provided on one side of the liquid crystal layer;
wherein the first polarizer reflects TE-polarized light impinging thereon from another side of the liquid crystal layer which is opposite to the one side;
wherein a light absorbing layer which absorbs the TE-polarized light impinging thereon from the one side of the liquid crystal layer is provided on a surface of the first polarizer which faces the liquid crystal layer;
wherein the first polarizer is a wire grid polarizer, and the light absorbing layer for absorbing TE-polarized light is provided on a surface of the wire grid polarizer which faces the liquid crystal layer;
wherein the light absorbing layer includes a plurality of stacked pairs of a dielectric wire layer and a metal wire layer which absorbs light vertically stacked on the surface of the wire grid polarizer; and
wherein a width of each wire of the wire grid polarizer is not more than 50% of a repetition interval of the wire grid polarizer.

19. A liquid crystal display device as claimed in claim 18, further comprising a reflection display section for making display by changing reflectivity by means of the liquid crystal layer driven by the potential difference between the first electrode and the second electrode, wherein the reflection display section makes reflection display by reflecting the external light transmitted through the first polarizer.

20. A liquid crystal display device as claimed in claim 18, wherein the wire grid polarizer with the light absorbing layer enables reduction of reflectivity of the TE-polarized light and an increase of reflectivity of TM-polarized light.

21. A liquid crystal display device as claimed in claim 18, wherein the wire grid polarizer enables transmittance of at least 50% of TM-polarized light over at least an entire wavelength range of 0.4 to 0.5 μm.

22. A liquid crystal display device as claimed in claim 18, wherein the dielectric wire layer absorbs light.

* * * * *